(12) United States Patent
Okada et al.

(10) Patent No.: US 10,311,580 B2
(45) Date of Patent: Jun. 4, 2019

(54) BED AREA EXTRACTION METHOD AND BED AREA EXTRACTION APPARATUS

(71) Applicant: FUJITSU LIMITED, Kawasaki-shi, Kanagawa (JP)

(72) Inventors: Yasutaka Okada, Kawasaki (JP); Kimitaka Murashita, Atsugi (JP)

(73) Assignee: FUJITSU LIMITED, Yokohama (JP)

( * ) Notice: Subject to any disclaimer, the term of this patent is extended or adjusted under 35 U.S.C. 154(b) by 34 days.

(21) Appl. No.: 15/454,046

(22) Filed: Mar. 9, 2017

(65) Prior Publication Data

US 2017/0301097 A1  Oct. 19, 2017

(30) Foreign Application Priority Data

Apr. 18, 2016 (JP) .................................. 2016-082864

(51) Int. Cl.
*G06T 7/194* (2017.01)
*G06T 7/11* (2017.01)
*G06T 7/60* (2017.01)

(52) U.S. Cl.
CPC ................ *G06T 7/194* (2017.01); *G06T 7/11* (2017.01); *G06T 7/60* (2013.01)

(58) Field of Classification Search
CPC .............. G06T 7/11; G06T 7/194; G06T 7/60
See application file for complete search history.

(56) References Cited

U.S. PATENT DOCUMENTS

2013/0100284 A1*  4/2013  Fujii .................... A61B 5/1113
                                                         348/135
2013/0215248 A1    8/2013  Ishii et al.

FOREIGN PATENT DOCUMENTS

JP       2008-167931 A      7/2008
JP       2012-71003 A       4/2012

* cited by examiner

*Primary Examiner* — Ruiping Li
(74) *Attorney, Agent, or Firm* — Westerman, Hattori, Daniels & Adrian, LLP

(57) ABSTRACT

A bed area extraction method includes specifying, by a computer, a first part of a bed candidate area in an image based on a first line segment extracted from the image; setting a search range for searching a second line segment with reference to the bed candidate area which is determined based on the specified first part of the bed candidate area; and correcting the bed candidate area based on a disposition of the second line segment included in the set search range.

14 Claims, 24 Drawing Sheets

BED AREA EXTRACTION METHOD AND BED AREA EXTRACTION APPARATUS

CROSS-REFERENCE TO RELATED APPLICATION

This application is based upon and claims the benefit of priority of the prior Japanese Patent Application No. 2016-082864, filed on Apr. 18, 2016, the entire contents of which are incorporated herein by reference.

FIELD

The embodiments discussed herein are related to a bed area extraction method and a bed area extraction apparatus.

BACKGROUND

In recent years, in medical institutions and nursing facilities, there is a case where a watching system using a camera has been used to watch getting up, leaving bed, and behaviors of a patient, a cared person, or the like lying on a bed instead of medical welfare workers such as nurses or care workers. Such a watching system is used for the purpose of notifying abnormality instead of a patient or the like in a case where there occur behaviors such as getting up and leaving bed of the patient or the like leading to falling down or falling accident, or extraordinary situations in which the patient is suffering and unable to press a nurse call button.

In the watching system, a technique for extracting a bed area from an image is disclosed since a range of the bed area in the image is used as a reference when recognizing a behavior of a person on the bed from the image captured by the camera.

Japanese Laid-open Patent Publication No. 2012-71003 and Japanese Laid-open Patent Publication No. 2008-167931 are examples of the related art.

SUMMARY

According to an aspect of the invention, a bed area extraction method includes specifying, by a computer, a first part of a bed candidate area in an image based on a first line segment extracted from the image; setting a search range for searching a second line segment with reference to the bed candidate area which is determined based on the specified first part of the bed candidate area; and correcting the bed candidate area based on a disposition of the second line segment included in the set search range.

According to another aspect of the invention, a non-transitory computer-readable recording medium having stored therein a program that causes a computer to execute a process, the process includes: specifying a first part of a bed candidate area in an image based on a first line segment extracted from the image; setting a search range for searching a second line segment with reference to the bed candidate area which is determined based on the specified first part of the bed candidate area; and correcting the bed candidate area based on a disposition of the second line segment included in the set search range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
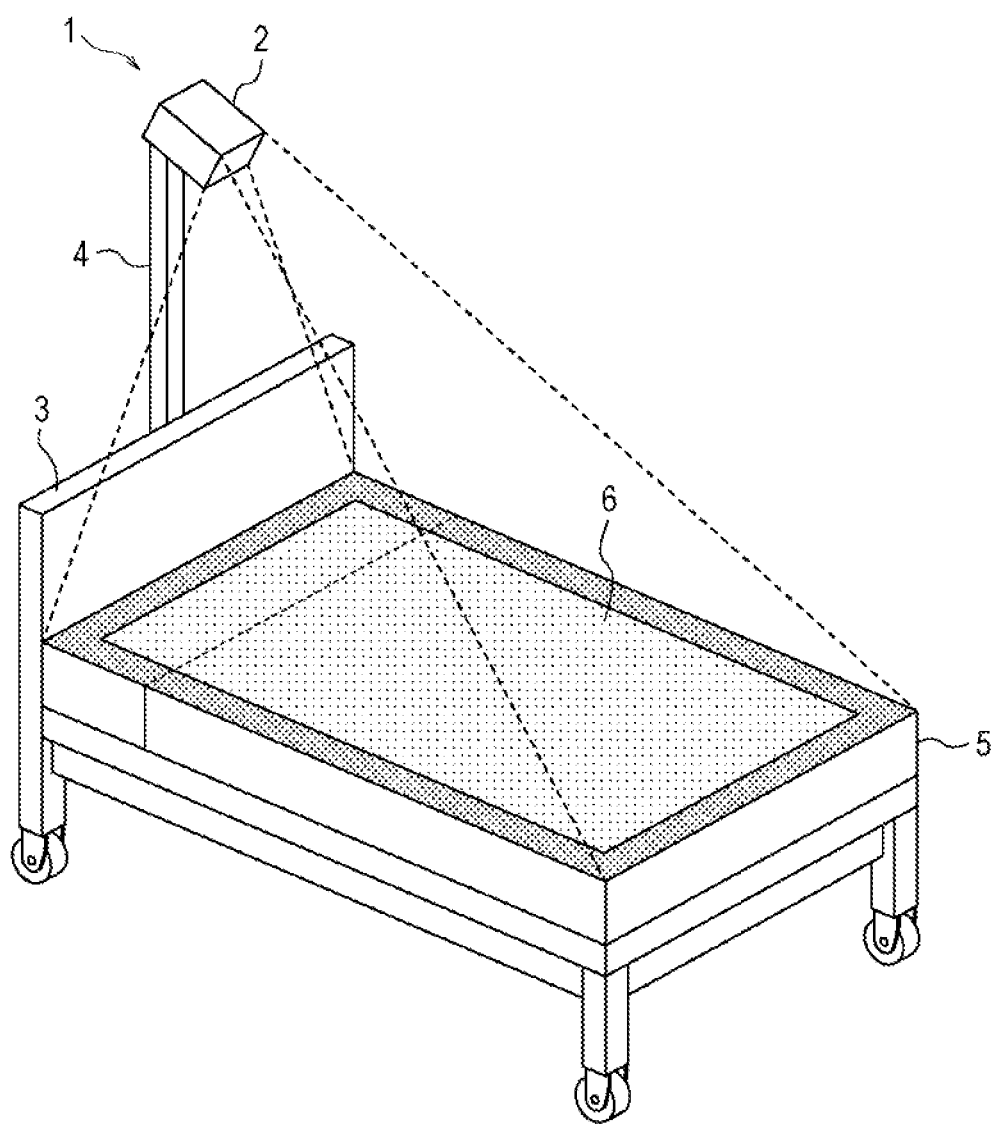
FIG. 1 is a diagram illustrating an installation example of a bed area extraction apparatus.

Depending on shapes of accessories in a periphery of a bed, for example, a shape of a head board, detection errors may occur between an actual bed position and a position of a bed area extracted from an image when using the related art.

In one aspect, it is desired to improve accuracy of extracting a bed area from the image even when a head board is attached to a bed.

Hereinafter, an example of embodiments of a disclosed technique will be described in detail with reference to drawings. Furthermore, in following descriptions, the same reference numerals are given to the constituent elements or processes having the same functions throughout the entire drawings, and duplicated explanations are appropriately omitted.

As illustrated in FIG. 1, a camera 2 of a bed area extraction apparatus 1 according to the present embodiment is disposed in a support 4 attached from a bed 5 in a ceiling direction. The camera 2 images the bed 5 from above the bed 5 so as to include an entire rectangular bed area 6 which is an area on which a patient lies and to which dots are applied within an imaging range. Furthermore, a type of the camera 2 to be used is not limited thereto, but in the present embodiment, a monocular camera which is often inexpensive compared to a compound eye camera is used. In addition, in the following description, it is assumed that a shape of the bed 5 is a rectangle.

In order to suppress the patient or the like from falling off from a head, in many cases, a head board 3 is attached to a short side on a side in which the head of the patient is placed in the bed 5 installed in a medical facility and a nursing facility or the like. Therefore, the following description will be performed based on a premise that the head board 3 is attached to the bed 5.

Next, a configuration example of the bed area extraction apparatus 1 will be described with reference to FIG. 2. The bed area extraction apparatus 1 includes an imaging unit 10, a bed area estimating unit 20, a search range setting unit 30, a line segment information acquisition unit 40, a correction determination unit 50, a correction unit 60, and an output unit 70.

The camera 2 is connected to the imaging unit 10. The imaging unit 10 controls the camera 2, causes the camera 2 to capture an image (hereinafter, referred to as "bed image") including the bed 5, and outputs the captured bed image to the bed area estimating unit 20.

The bed area estimating unit 20 extracts line segments from the bed image by applying a well-known line segment extraction method, such as a Canny method or Hough transform with respect to the received bed image. There is a case where the bed image may include images of accessories such as a blanket on a bed 5, a television installed in a vicinity of the bed 5, and curtains surrounding a periphery of the bed 5 in addition to the bed 5. Therefore, the line segments extracted by the bed area estimating unit 20 may include line segments corresponding to wrinkles and contours of the blanket, the curtains, and the like in addition to line segments corresponding to contours of the bed 5.

Figure 3A:
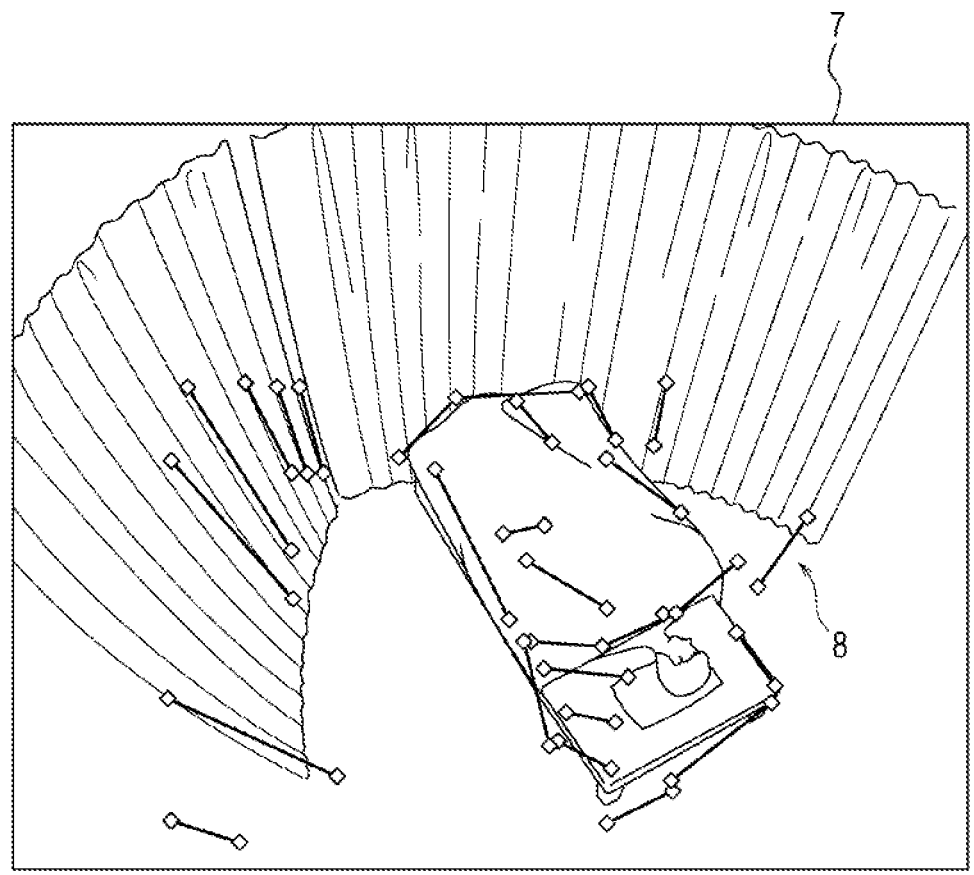
FIG. 3A is a diagram illustrating an example of line segments extracted from a bed image.

In FIG. 3A, an example of line segments extracted from a bed image 7 is illustrated as line segments 8 in which circles are drawn at both ends. As illustrated in FIG. 3A, in a case where the extracted line segments 8 includes line segments other than the line segment corresponding to the contours of the bed 5, it is difficult to estimate which line segments 8 are the line segments 8 indicating the bed area 6. First, the bed area estimating unit 20 converts the line segments 8 extracted from the bed image 7 into the line segments 8 on real space coordinate system, which is a three-dimensional orthogonal coordinate system in which the bed 5 is viewed from directly above.

Figure 3B:
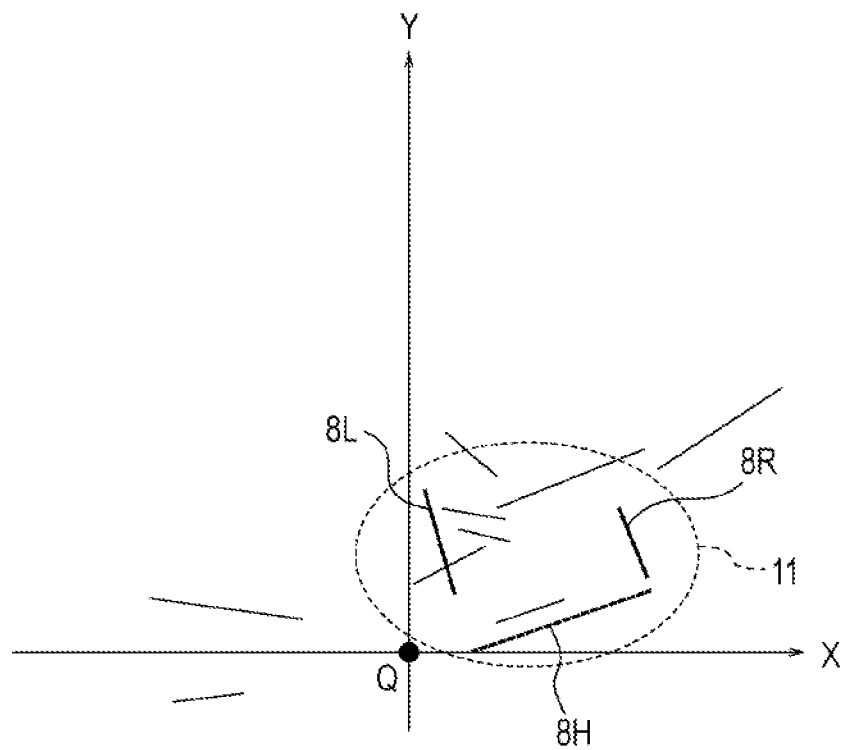
FIG. 3B is a diagram illustrating an example of a U-shaped portion extracted from the bed image.

FIG. 3B is a diagram illustrating an example in which a part of each of the line segments 8 illustrated in FIG. 3A is converted into line segments on real space coordinate system. As illustrated in FIG. 3B, the real space coordinate system are represented by respective axes of X, Y, and Z. An origin point Q in the real space coordinate system is an intersection between a floor of a room as a surface and a perpendicular line drawn from the camera 2 toward the floor in which the bed 5 is installed. In the imaging range captured by of the camera 2, a X-axis is an axis which passes through the origin point Q and extends to the left and right direction, a Y-axis is an axis which passes through the origin point Q and extends to a vertical direction, and a Z-axis is an axis which passes the origin point Q and extends along the perpendicular line. The direction of the Z-axis in FIG. 3B is orthogonal to each of the X-axis and the Y-axis.

The bed area estimating unit 20 extracts combinations of line segments corresponding to characteristic portions representing the shape of a part of the bed 5 from the respective line segments 8 on the real space coordinate system. Specifically, for example, a combination of line segments corresponding to a portion 11 having a shape obtained by removing one side of a rectangle is extracted. The portion 11 is formed to have a line segment corresponding to an upper side of the head board 3 and a line segment extending in the longitudinal direction of the bed 5 from corner portions at both ends of the head board 3. In the following description, the portion 11 having the shape obtained by removing one side of the rectangle is referred to as "U-shaped portion 11".

In the example of FIG. 3B, a line segment 8H is a line segment corresponding to an upper side of the head board 3. Line segments 8R and 8L are line segments which correspond to upper sides of side surfaces of the bed 5 and are orthogonal to the head board 3. Furthermore, the line segments 8R and 8L are generally extracted from only a part of long sides of the bed 5 which are not hidden by the blanket.

Figure 3C:
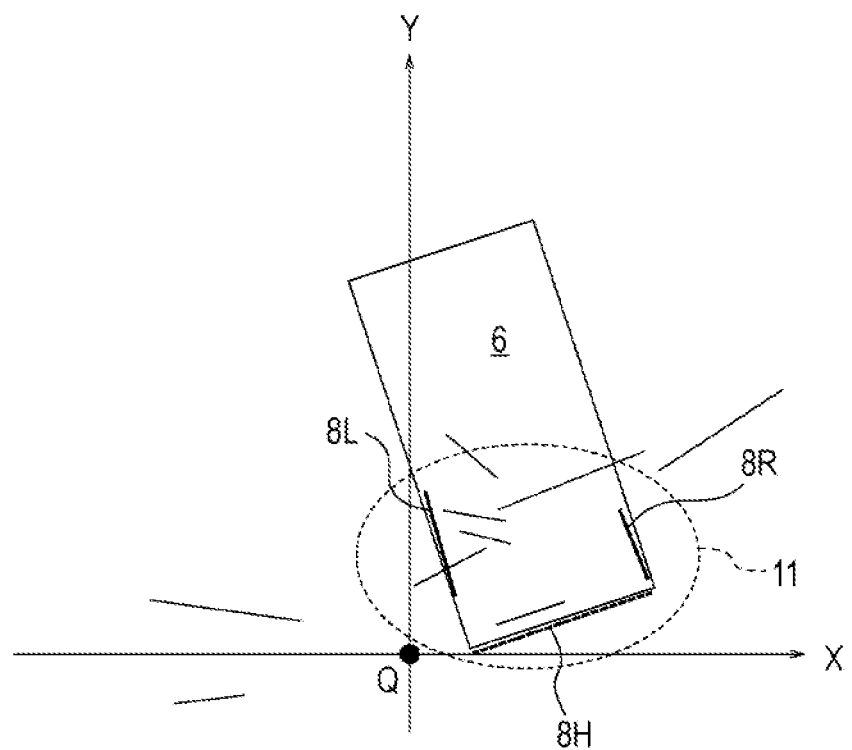
FIG. 3C is a diagram illustrating an example of a bed area.

On the other hand, since a size of the bed 5 is already known, a size of the bed area 6 in the real space coordinate system is also known. Therefore, the bed area estimating unit 20 specifies a position of the bed area 6 so that contours of the bed area 6 including corner portions at both ends of the head board 3 overlap as much as possible with the estimated U-shaped portion 11, and set candidates for the bed area 6 on the real space coordinate system (see FIG. 3C). Furthermore, the bed area estimating unit 20 is an example of a specifying unit in the embodiment.

However, according to an extraction state of the line segment 8H corresponding to the head board 3, detection accuracy of the U-shaped portion 11 of the bed 5 is reduced and an error may be included in an estimated position of the bed area 6. In this case, it is considered that the line segments 8 corresponding to contours of the actual bed 5 exist in a periphery of the bed area 6.

Figure 4:
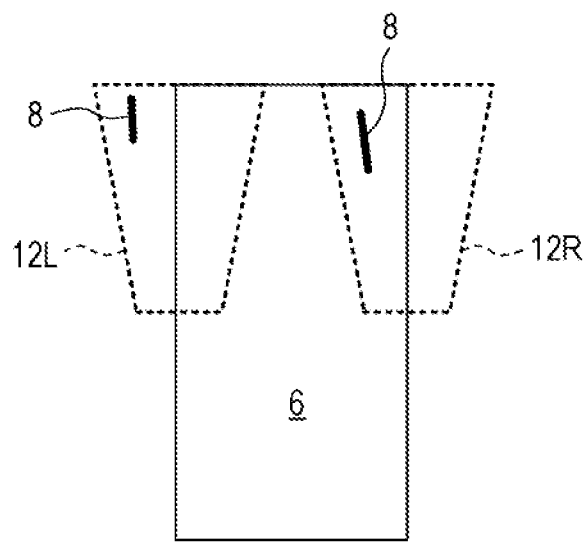
FIG. 4 is a diagram illustrating a setting example of a search range.

Therefore, the search range setting unit 30 calculates a maximum estimation error of the bed area 6 estimated from a shape of the head board 3 and respectively sets the search ranges 12R and 12L for the line segments 8 corresponding to the contours of the bed 5 along a pair of long sides of the bed area 6 as illustrated in FIG. 4.

The line segment information acquisition unit 40 acquires information on candidates of the line segments 8 which are considered to correspond to the contour of the bed 5 from each of the line segments 8 included in the search ranges 12R and 12L set by the search range setting unit 30.

The correction determination unit 50 determines whether or not the acquired line segment 8 is the line segment 8 corresponding to the contours of the bed 5 based on a direction and a length of the line segment 8 acquired by the line segment information acquisition unit 40.

Figure 5:
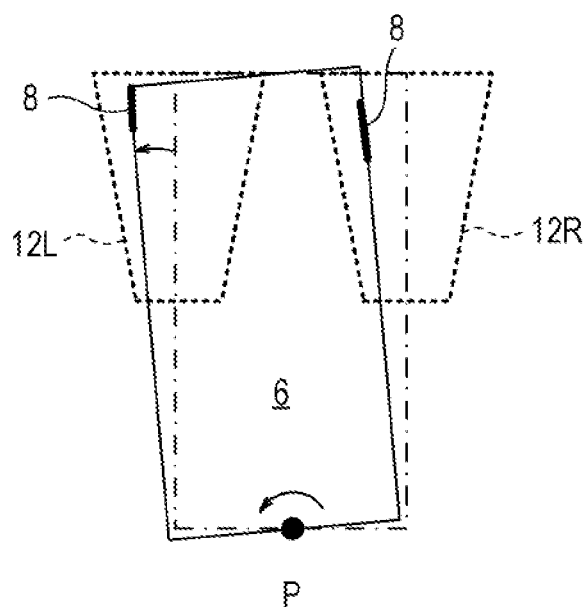
FIG. 5 is a diagram illustrating a correction example of the bed area.

In a case where it is determined that the line segments 8 acquired by the line segment information acquisition unit 40 are the line segments 8 corresponding to the contour of the bed 5 as a result of determination by the correction determination unit 50, the correction unit 60 corrects a position of the bed area 6 so that a direction of the bed area 6 approaches a direction of the line segments 8 (see FIG. 5). In this case, the correction unit 60 corrects the position of the bed area 6 by rotating the bed area 6 around a point P indicating a midpoint of the side of the bed area 6 corresponding to the head board 3.

On the other hand, in a case where it is determined that the line segments 8 acquired by the line segment information acquisition unit 40 are not the line segments 8 corresponding to the contour of the bed 5 as a result of determination by the correction determination unit 50, the correction unit 60 does not correct the position of the bed area 6 estimated by the bed area estimating unit 20.

The output unit 70 outputs the obtained position information on the bed area 6 to another device, for example, a state detection device which watches a state of the patient or the like with reference to the bed area 6.

Figure 2:
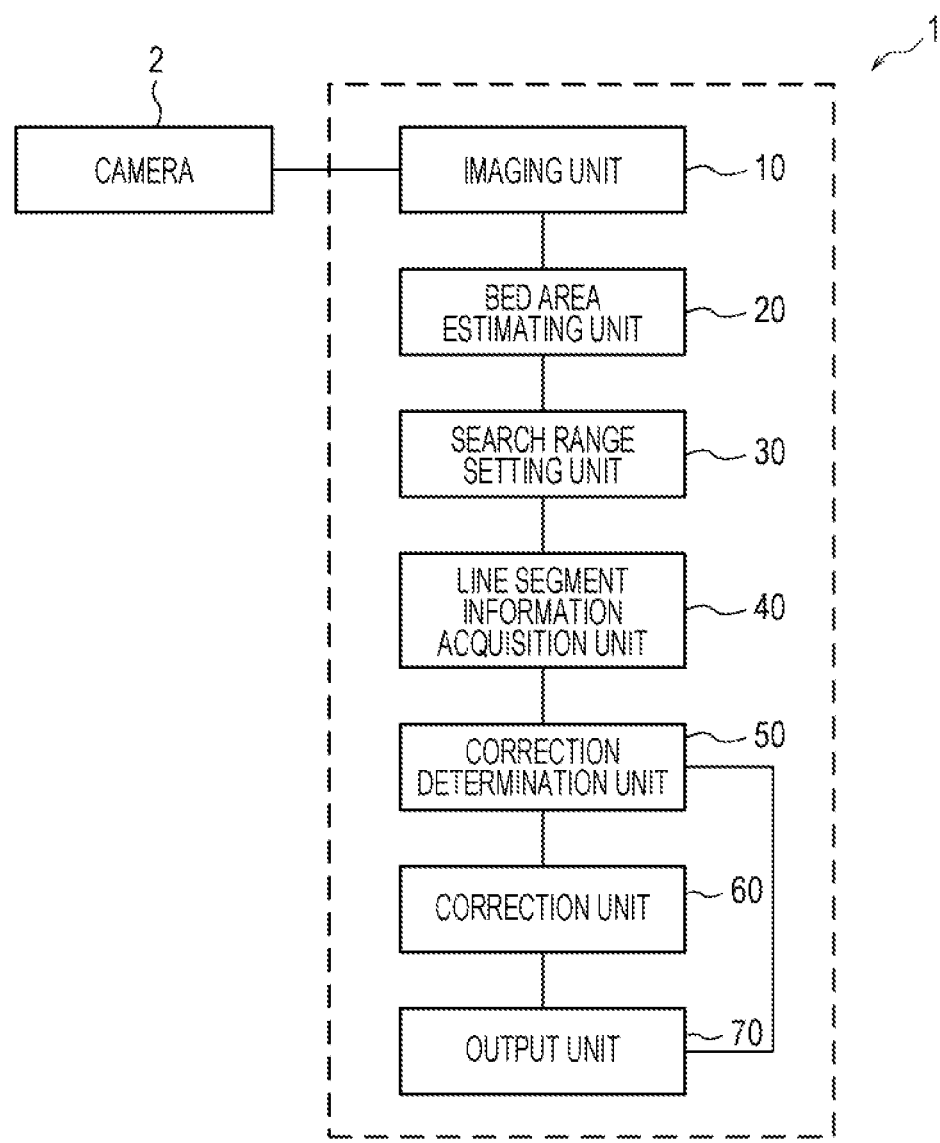
FIG. 2 is a diagram illustrating a configuration example of the bed area extraction apparatus.
Figure 6:
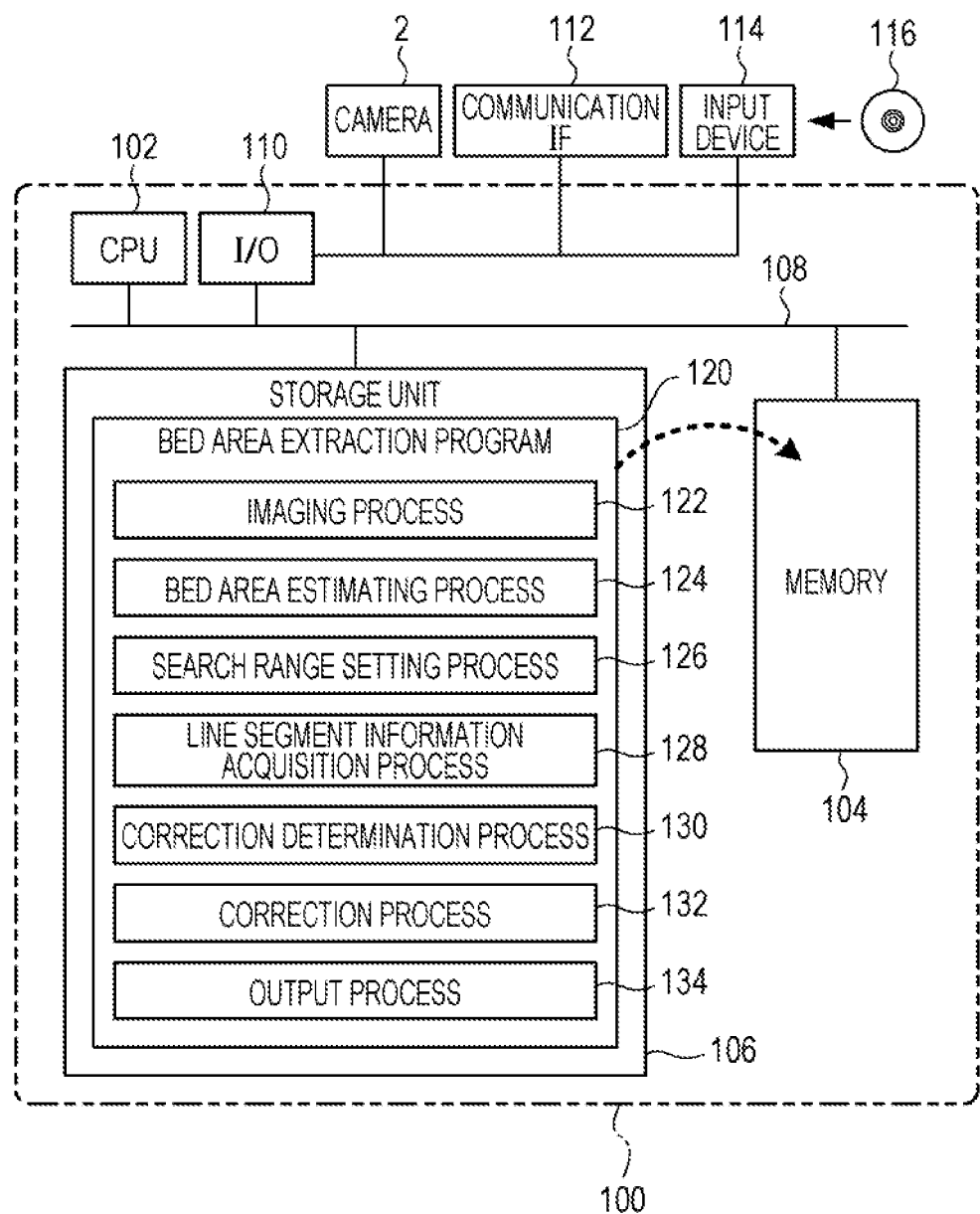
FIG. 6 is a diagram illustrating a configuration example in a case of causing a computer to realize the bed area extraction apparatus.

The bed area extraction apparatus 1 illustrated in FIG. 2 may be achieved by a computer 100 illustrated in FIG. 6.

The computer 100 or a processor includes a CPU 102, a memory 104, and a storage unit 106 including a nonvolatile memory. The CPU 102, the memory 104, and the storage unit 106 are coupled to each other via a bus 108. In addition, the computer 100 includes an input/output (I/O) 110 for coupling the camera 2, a communication IF 112, and an input device 114 with the computer 100 and the I/O 110 is coupled with the bus 108.

The communication IF 112 is coupled with, for example, network to which an external device such as a state detection device for watching the state of the patient or the like is connected and transmits and receives data to and from the external device. A type of the network to which the communication IF 112 connected is not limited and may be wired or wireless regardless of types of lines such as Internet, intranet, dedicated line, and the like.

An input device 114 includes, for example, input devices such as a button, a switch, a touch panel, and the like for notifying the bed area extraction apparatus 1 of instructions by an operator. Further, the input device 114 may include a reading device which reads a program or the like recorded on a recording medium 116 such as a compact disc (CD), a digital versatile disk (DVD), a memory card, or the like.

Furthermore, a device other than the camera 2, the communication IF 112, and the input device 114 may be coupled with the I/O 110. For example, a display device which displays the bed image 7 or the like captured by the camera 2 may be coupled with the I/O 110.

The storage unit 106 is achieved by a flash memory or hard disk drive (HDD) or the like and the storage unit 106 stores a bed area extraction program 120 for causing the computer 100 to function as the bed area extraction apparatus 1 illustrated in FIG. 2.

The bed area extraction program 120 includes an imaging process 122, a bed area estimating process 124, a search range setting process 126, a line segment information acquisition process 128, a correction determination process 130, a correction process 132, and an output process 134.

That is, the CPU 102 executes the imaging process 122, and the computer 100 operates as the imaging unit 10 illustrated in FIG. 2. In addition, the CPU 102 executes the bed area estimating process 124, and the computer 100 operates as the bed area estimating unit 20 illustrated in FIG. 2. In addition, the CPU 102 executes the search range setting process 126, and the computer 100 operates as the search range setting unit 30 illustrated in FIG. 2. In addition, the CPU 102 executes the line segment information acquisition process 128, and the computer 100 operates as the line segment information acquisition unit 40 illustrated in FIG. 2. In addition, the CPU 102 executes the correction determination process 130, and the computer 100 operates as the correction determination unit 50 illustrated in FIG. 2. In addition, the CPU 102 executes the correction process 132, and the computer 100 operates as the correction unit 60 illustrated in FIG. 2. Further, the CPU 102 executes the output process 134, and the computer 100 operates as the output unit 70 illustrated in FIG. 2.

Furthermore, the processor or the computer 100 may also be achieved by, for example, a semiconductor integrated circuit, more specifically, an application specific integrated circuit (ASIC) or the like.

Figure 7:
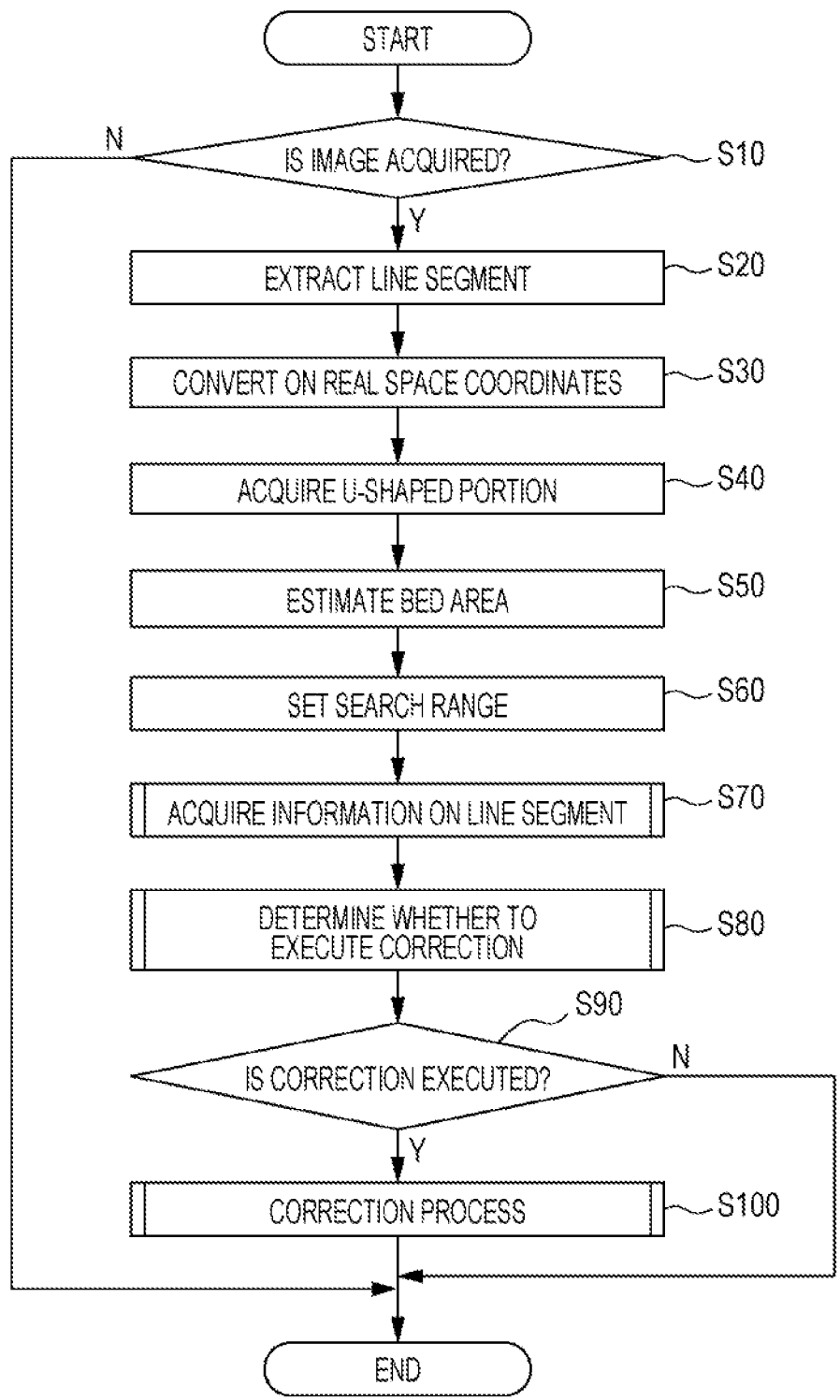
FIG. 7 is a flowchart illustrating an example of a flow of a bed area extraction process.

Next, an action or operation of the bed area extraction apparatus 1 according to the present embodiment will be described. The bed area extraction apparatus 1 executes the bed area extraction program 120 after the bed area extraction apparatus 1 is activated, and a bed area extraction process illustrated in FIG. 7 is executed at predetermined time intervals.

First, in step S10, the imaging unit 10 outputs an imaging start instruction to the camera 2 to capture the bed image 7 and determines whether or not the captured bed image 7 is acquired from the camera 2. In a case where it is determined that the captured bed image 7 is not acquired by a breakdown or the like of the camera 2, this case is a negative determination and the bed area extraction process illustrated in FIG. 7 is ended. On the other hand, a case where it is determined that the captured bed image 7 is acquired from the camera 2 is a positive determination, the process is moved to step S20.

In step S20, the bed area estimating unit 20 extracts the line segments 8 corresponding to contours, wrinkles, patterns, and the like of an object given to the bed image 7 acquired in step S10 by applying the well-known line segment extraction method, for example, the Canny method or Hough transform.

In step S30, the bed area estimating unit 20 converts the line segments 8 extracted from the bed image 7 into the line segments 8 on real space coordinate system.

Here, an installation position of the camera 2 in the real space coordinate system and a mounting angle including a roll angle $\alpha$, a pitch angle $\beta$, and a yaw angle $\gamma$ of the camera 2 are known. Therefore, by using a coordinate transformation formula defined by the known parameters, coordinates of both ends of each of line segments 8 in the bed image 7 may be converted into real space coordinates. Furthermore, the roll angle $\alpha$ is a rotation angle of the camera 2 around the X-axis, the pitch angle $\beta$ is a rotation angle of the camera 2 around the Y-axis, and the yaw angle $\gamma$ is a rotation angle of the camera 2 around the Z-axis.

The bed area estimating unit 20 stores coordinates of both ends of each of the line segments 8 on the real space coordinate system acquired in step S30 to, for example, a predetermined area of the memory 104.

In the present embodiment, as illustrated in FIG. 1, since the camera 2 is installed above the bed 5 to which the head board 3 is attached, the patient's head is placed on a lower side of the bed image 7, that is, on a near side and the patient's foot appears on an upper side of the bed image 7, that is, on a far side.

For example, a lighting device or the like (not illustrated) is attached to the camera 2 and by illuminating the bed 5 with light at the time of imaging, the bed 5 is easily imaged to the bed image 7. However, since the camera 2 is attached to the head board 3 side, as a distance in the Y-axis direction from the camera 2 increases, an intensity of the light illuminated by the lighting device (not illustrated) decreases. Therefore, in the bed image 7, since there is a case where the contours of the bed 5 on the foot side of the patient becomes unclear compared with contours of the head board 3 side, it is often difficult to extract an entire boundary line indicating the bed area 6 from the bed image 7.

Therefore, in step S40, the bed area estimating unit 20 extracts a combination of line segments corresponding to the U-shaped portion 11 formed so as to include two corner portions of the bed 5 from among the line segments 8 on the real space coordinate system acquired in step S30.

Specifically, the U-shaped portion 11 of the bed 5 has a shape formed by the line segments 8 corresponding to a part of each of long sides of the bed 5 and side of the head board 3 orthogonal to the two long sides. In the example of FIG. 3B described above, the line segment 8H is a line segment corresponding to the head board 3 and the line segments 8R and 8L are respectively line segments corresponding to each of long sides of the bed 5 orthogonal to the head board 3. The U-shaped portion 11 is formed by the line segments 8H, 8R, and 8L.

In this manner, since the U-shaped portion 11 is a characteristic portion representing a shape of the bed 5 with a rectangular shape, the combination of the line segments 8 forming the U-shaped portion 11 is extracted from each of the line segments 8 is extracted.

Furthermore, in a case where a plurality of combinations of the line segments 8 forming the U-shaped portion 11 are extracted from each of the line segments 8, the U-shaped portion 11 formed by a combination of the line segments 8 having a smaller value of a Y coordinate of each of the line segments 8 than other U-shaped portions 11 is selected.

As described above, since the camera 2 is mounted above the head board 3, the U-shaped portion 11 including the line segments 8 having the small value of the Y coordinate is more likely to be the U-shaped portion 11 corresponding to the contours of the bed 5 including the head board 3. Furthermore, since an illumination is applied to the bed 5 from the installation position of the camera 2, the U-shaped portion 11 including the line segments 8 having the small Y coordinate value may be extracted more accurately from the bed image 7 than other U-shaped portions 11.

Figure 8A:
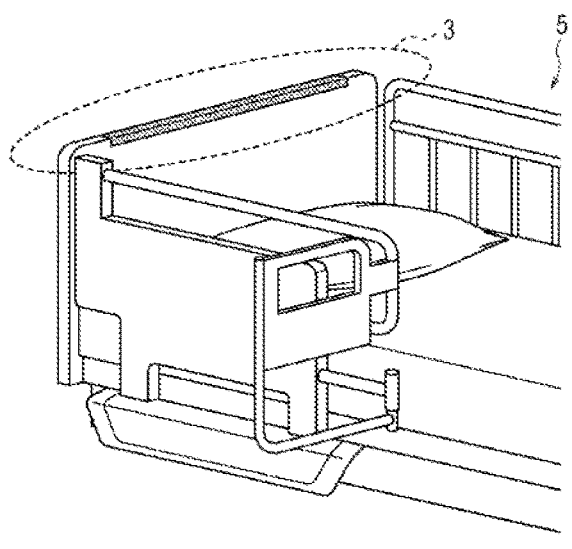
FIGS. 8A and 8B are schematic diagrams illustrating a head board.
Figure 8B:
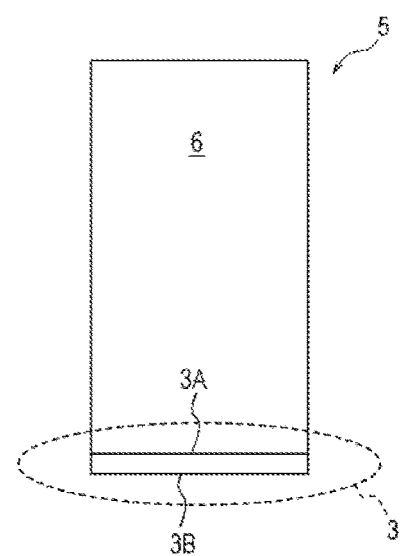

As illustrated in FIG. 8A, in order to secure strength of the head board 3 on the head board 3, the head board 3 has a thickness of, for example, approximately several centimeters along the longitudinal direction of the bed 5. As illustrated in FIG. 8B, when viewing the bed 5 from directly above, it may be confirmed that an upper side 3A of the head board 3 closer to the patient's head (inside) and an upper side 3B of the head board 3 far from the patient's head (outside). For this reason, there is a case where two line segments 8H corresponding to the upper sides 3A and 3B on the real space coordinate system are extracted.

Figure 9:
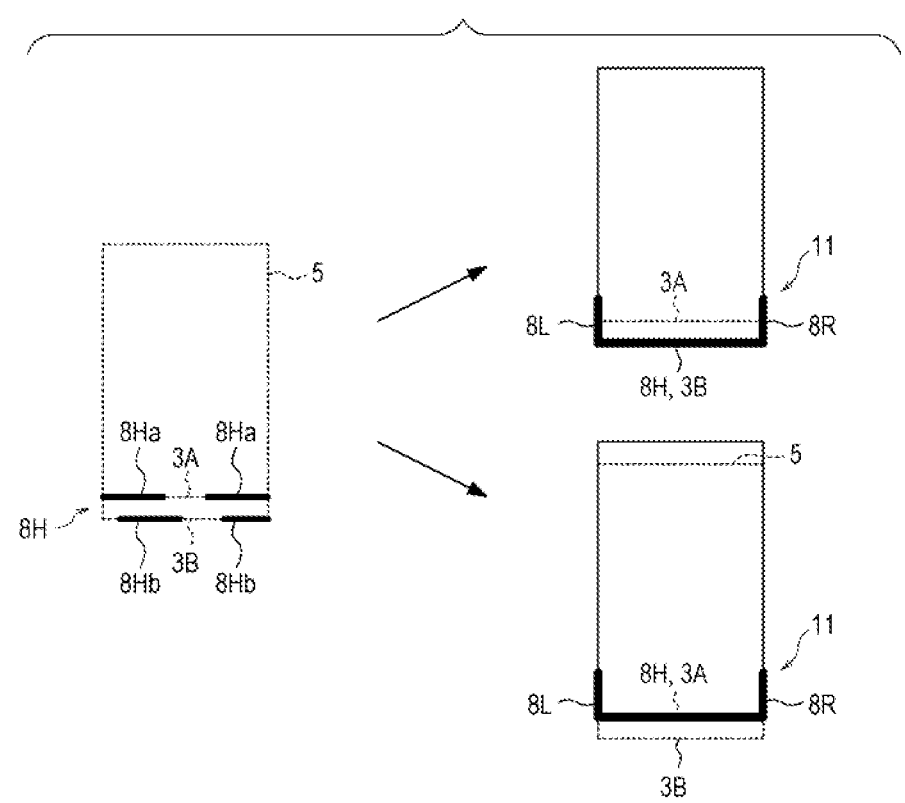
FIG. 9 is a diagram illustrating an extraction example of line segments corresponding to the head board.

However, depending on an imaging condition of the bed image 7, there occurs a situation in which the line segment 8H is not extracted clearly along sides of the head board 3, and as illustrated in FIG. 9, the upper sides 3A and 3B of the head board 3 may be represented by interrupted segments such as a plurality of the line segments 8Ha and 8Hb.

Therefore, when the U-shaped portion 11 is extracted from a disposition of each of the line segments 8 on the real space coordinate system, the bed area estimating unit 20 integrates the plurality of the line segments 8H into one line segment 8H and sets the line segment 8H corresponding to the head board 3.

As illustrated in FIG. 9, when the line segment $8H_a$ corresponding to a part of the upper side 3A and the line segment $8H_b$ corresponding to a part of the upper side 3B overlap each other along the direction of the upper side 3A, the bed area estimating unit 20 extends one of the line segments $8H_a$ or $8H_b$ and integrates line segments included on an extension line. This is because it is considered a case where the line segments 8 included in the extension line of the line segment $8H_a$ or $8H_b$ is integrated is more naturally than a case where the line segments $8H_a$ and $8H_b$ having different Y coordinate values are regarded as only a part of the line segments 8 extending in the oblique direction with respect to the X-axis and integrated.

Figure 10:
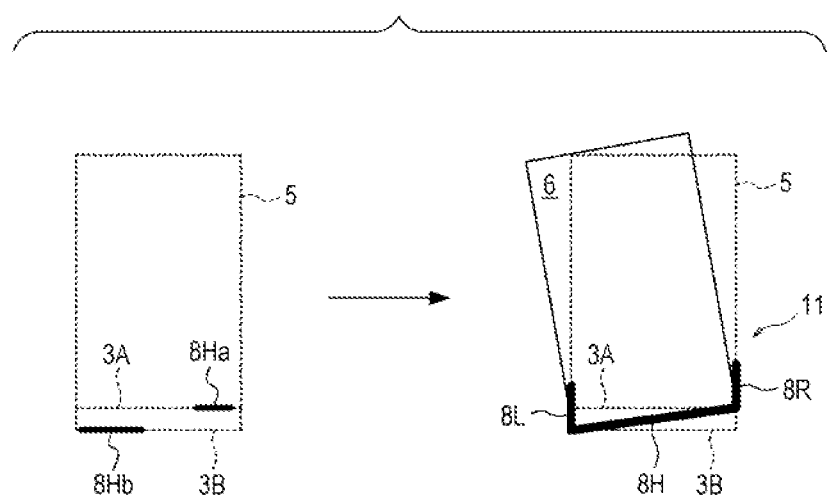
FIG. 10 is a diagram illustrating an extraction example of line segments corresponding to the head board.

However, as in an example of FIG. 10, in a case where the line segment $8H_a$ and the line segment $8H_b$ do not overlap along the direction of the upper side 3A and other line segments 8 do not exist on the extension lines of the line segment $8H_a$ and the line segment $8H_b$, the bed area estimating unit 20 integrates the line segment $8H_a$ and the line segment $8H_b$ in the oblique direction to obtain the line segment 8H. This is because there is no line segment which may be integrated on the extension line of the line segment $8H_a$ and the line segment $8H_b$ and there is also no overlapping portion along the direction of the upper side 3A in the line segment $8H_a$ and the line segment $8H_b$, it is natural to consider that the line segment $8H_a$ and the line segment $8H_b$ are originally a part of one line segment 8H.

In step S50, the bed area estimating unit 20 estimates the bed area 6 on the real space coordinate system in accordance with the U-shaped portion 11 extracted in step S40. In this case, since the size of the bed 5 is already known, the size of the bed area 6 in the real space coordinate system is also known. When the bed area estimating unit 20 disposes corner portions of the bed area 6 having a predetermined size so as to match the U-shaped portion 11, it is possible to estimate the position of the bed area 6 on the real space coordinate system.

However, as described above, because of the thickness of the head board 3, there is a case where the line segment 8H corresponding to an upper side of the head board 3 of the U-shaped portion 11 is inclined with respect to the actual head board 3 and is extracted. Therefore, there is a case where the estimated bed area 6 includes an error for an actual position of the bed 5. In this case, since the line segments 8 corresponding to contours of the bed 5 exist in the periphery of the bed area 6, when it is possible to specify the line segments 8 corresponding to the contours of the bed 5, it is possible to correct so that the bed area 6 estimated in step S50 is close to the actual position of the bed 5.

In order to specify the line segments 8 corresponding to the contours of the actual bed 5, in step S60, the search range setting unit 30 sets the search ranges 12R and 12L of the line segments 8 for each of long sides so as to include the long sides of the estimated bed area 6.

The search ranges 12R and 12L are set based on a shape of the head board 3 by, for example, a method described below.

Figure 11:
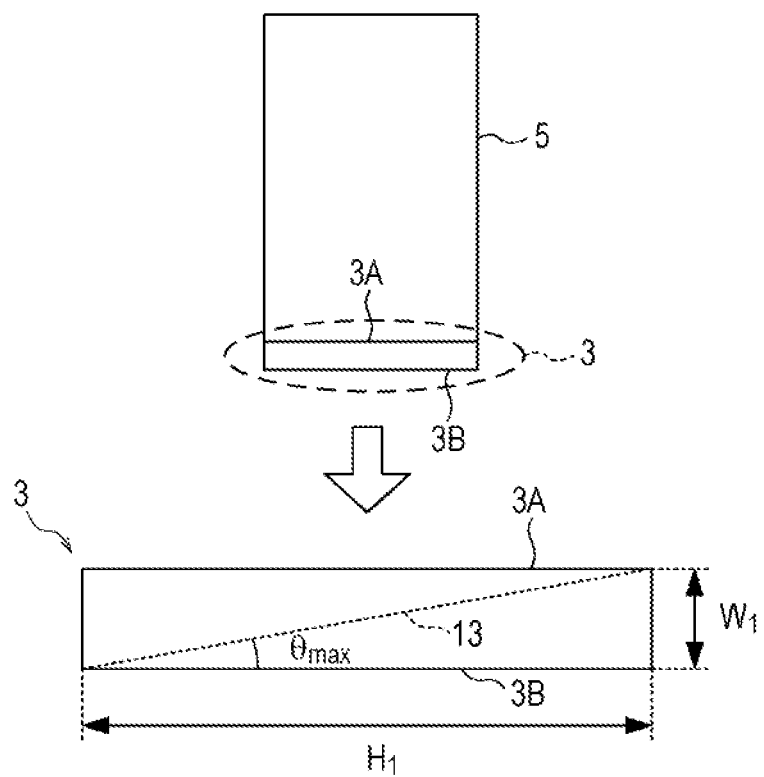
FIG. 11 is a schematic diagram for explaining the head board and a maximum deviation angle of a line segment corresponding to the head board.

FIG. 11 is an enlarged view of a part of the head board 3 of the bed 5. A deviation or misalignment of position between the line segment 8H corresponding to the head board 3 obtained by an integration of the line segments 8 and the actual head board 3 is represented by an angle (deviation angle) θ formed, for example, between the line segment 8H and the upper side 3A or the upper side 3B.

On the other hand, in a case where an angle formed between the line segment $8H_a$ or the line segment $8H_b$ before the integration and the line segment 8H after the integration is larger than an angle formed between the upper side 3A or the upper side 3B and a diagonal line 13 on a cross section of the head board 3, the bed area estimating unit 20 does not integrate the line segment $8H_a$ and the line segment $8H_b$. Therefore, a maximum deviation of the actual position of the bed 5 and the estimated bed area 6 is represented by an angle (hereinafter, referred to as maximum deviation angle $\theta_{max}$) formed by the upper side 3A or the upper side 3B of the head board 3 and the diagonal line 13 of the head board 3.

When a length of the head board 3 along the transverse direction of the bed 5 (hereinafter, referred to as "length of head board 3") is "$H_1$" and a thickness of a cross section of the head board 3 is "$W_1$", the maximum deviation angle $\theta_{max}$ is expressed by an expression (1).

$$\theta_{max}=\arctan(W_1/H_1) \quad (1)$$

Figure 12:
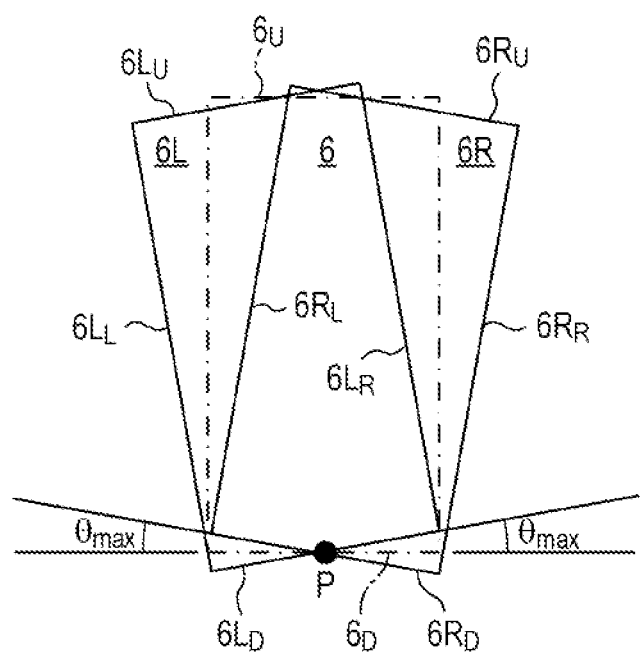
FIG. 12 is a schematic diagram for explaining a deviation of the bed area corresponding to the maximum deviation angle.

Therefore, as illustrated in FIG. 12, the maximum deviation of the estimated bed area 6 with respect to the actual position of the bed 5 is limited to a range obtained by rotating the bed area 6 by the maximum deviation angle $\theta_{max}$ in the clockwise and counterclockwise directions with a point P as a center of rotation, where the point P is on a side $6_D$ of the bed area 6 corresponding to the head board 3. FIG. 12 illustrates that a bed area 6R surrounded by a side $6R_U$, a side $6R_L$, a side $6R_D$, and a side $6R_R$ is a bed area in a case where the bed area 6 estimated in step S50 is rotated in the clockwise direction around the point P as the center of rotation. In addition, a bed area 6L surrounded by a side $6L_U$, a side $6L_L$, a side $6L_D$, and a side $6L_R$ is a bed area in a case where the bed area 6 estimated in step S50 is rotated in the counterclockwise direction around the point P as the center of rotation.

Figure 13:
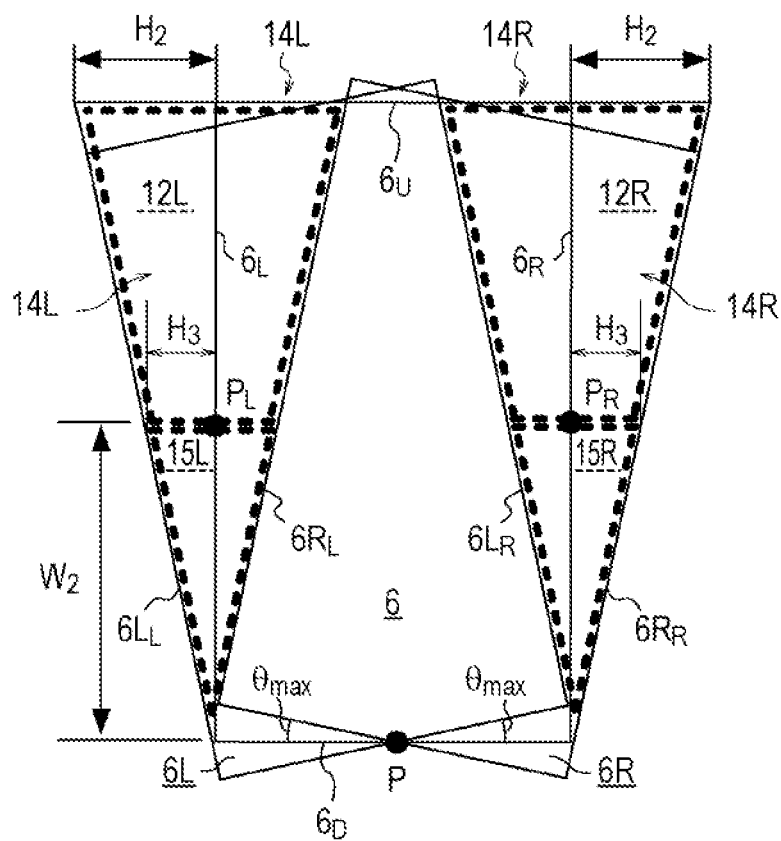
FIG. 13 is a diagram illustrating an example of a setting range, a search range, and a non-search range.

As illustrated in FIG. 13, for example, the search range setting unit 30 sets a setting range 14L surrounded by a long side $6L_L$ of the bed area 6L, a long side $6R_L$ of the bed area 6R, and a line obtained by extending a short side $6_U$ on the opposite side facing the head board 3 of the bed area 6. Although the setting range 14L may include the line segments 8 corresponding to contours of a side face on a left side of the actual bed 5, the search range setting unit 30 further sets a search range 12L within the setting range 14L in order to narrow down a search range of the line segments 8.

In the same manner, for example, the search range setting unit 30 sets a setting range 14R surrounded by a right side $6R_R$ in the longitudinal direction of the bed area 6R, a right side $6L_R$ in the longitudinal direction of the bed area 6L, and a line obtained by extending a side $6_U$ of the bed area 6. Although the setting range 14R may include the line segments 8 corresponding to contours of a side face on a right side of the actual bed 5, the search range setting unit 30 further sets a search range 12R within the setting range 14R in order to narrow down a search range of the line segments 8.

In the present embodiment, as an example, ranges positioned above a straight line passing through a point $P_R$ and a point $P_L$ is set as the search ranges 12R and 12L among the setting ranges 14R and 14L, where the point $P_R$ indicates a midpoint of the side $6_R$ and a point $P_L$ indicates a midpoint of the side $6_L$. The sides $6_R$ and $6_L$ are the sides of the estimated bed area 6. A reason why the search range setting unit 30 sets the search ranges 12R and 12L as described above will be described below.

Since the setting ranges 14R and 14L are triangles, ranges 15R and 15L positioned below a straight line passing through the points $P_R$ and $P_L$ among the setting ranges 14R and 14L are areas in which a distance from the side $6_R$ or the side $6_L$ is equal to or less than $H_3$.

The line segments 8 included in a range in which the distance from the side $6_R$ or the side $6_L$ is equal to or less than $H_3$ tend to be accessories near the bed 5, for example, contours of the blanket on the bed 5. The range is hereinafter referred to as the vicinity of side $6_R$ or side $6_L$.

In addition, since the bed 5 may have a large-sized furniture among indoor accessories, in many cases, the line segment 8 representing the contours of the bed 5 are the line segment 8 having relatively long line segments having lengths equal to or longer than a prescribed or certain length. However, the ranges 15R and 15L have smaller areas than the search ranges 12R and 12L. Therefore, in a case where the range 15R or 15L includes the line segments 8 having the lengths equal to or longer than the prescribed or certain length, an angle formed between the line segments 8 and the side $6_R$ or the side $6_L$ tends to be smaller than the angle in the line segments 8 included in the search ranges 12R and 12L.

That is, there are many cases where a direction of the line segments 8 equal to or longer than the prescribed or certain length included in the range 15R or 15L seems to be equal to a direction of the side $6_R$ and the side $6_L$ of the estimated bed area 6.

Therefore, even when the line segments 8 equal to or longer than the prescribed or certain length included in the range 15R or 15L, it is difficult to accurately correct the deviation of the bed area 6 from the line segments 8. Accordingly, the search range setting unit 30 sets the search ranges 12R and 12L to a search range of the line segments 8. Hereinafter, the ranges 15R and 15L are respectively referred to as "non-search range 15R" and "non-search range 15L".

For example, when a length $W_{bed}$ is the long side $6_L$ of the bed area 6, lengths $H_2$ and $H_3$ in the search ranges 12R and 12L respectively expressed by expressions (2) and (3).

$$H_2=W_{bed}\times\tan\theta_{max} \quad (2)$$

$$H_3=(W_{bed}\times\tan\theta_{max})/2 \quad (3)$$

In the present embodiment, although ranges positioned above straight lines passing through the point $P_R$ and the point $P_L$ in the setting ranges 14R and 14L are set to the search ranges 12R and 12l, a setting method of the search ranges 12R and 12L is not limited thereto. Within ranges of the setting ranges 14R and 14L, the search ranges 12R and 12L may be set to be wide or narrow.

In step S70, the line segment information acquisition unit 40 acquires the line segments 8 (hereinafter, "contour candidate line segment") which is considered to indicate the contours of the bed 5 among the line segments 8 extracted from the bed image 7 in step S20.

For this purpose, the line segment information acquisition unit 40 sets three areas to each periphery of the side $6_R$ and the side $6_L$ of the bed area 6 estimated in step S50.

Figure 14:
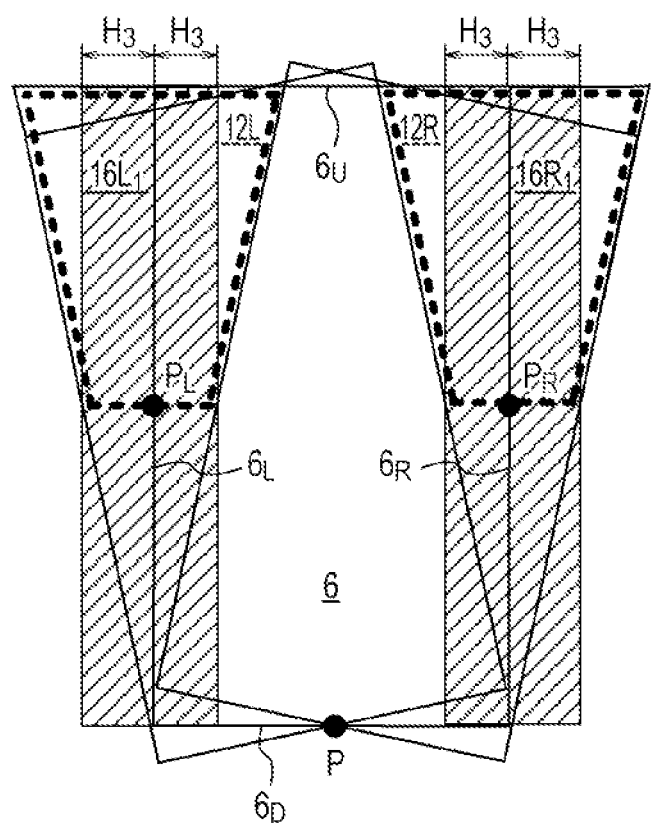
FIG. 14 is a diagram illustrating an example of a range of a first area.

FIG. 14 is a diagram illustrating an example of ranges of first areas $16R_1$ and $16L_1$. The first area $16R_1$ is an area with a rectangular shape set so as to include the side $6_R$ of the bed area 6 estimated in step S50. A length of the long side of the first area $16R_1$ is the length $W_{bed}$ of the side $6_R$, a length of a short side of the first area $16R_1$ is a length of a side of the search range $12R$ passing through the point $P_R$, that is, a length twice the length $H_3$.

On the other hand, the first area $16L_1$ is an area with a rectangular shape set so as to include the side $6_L$ of the bed area 6 estimated in step S50. A length of each side of the first area $16L_1$ is equal to a length of each side of the first area $16R_1$ corresponding to the first area $16L_1$.

Figure 15:
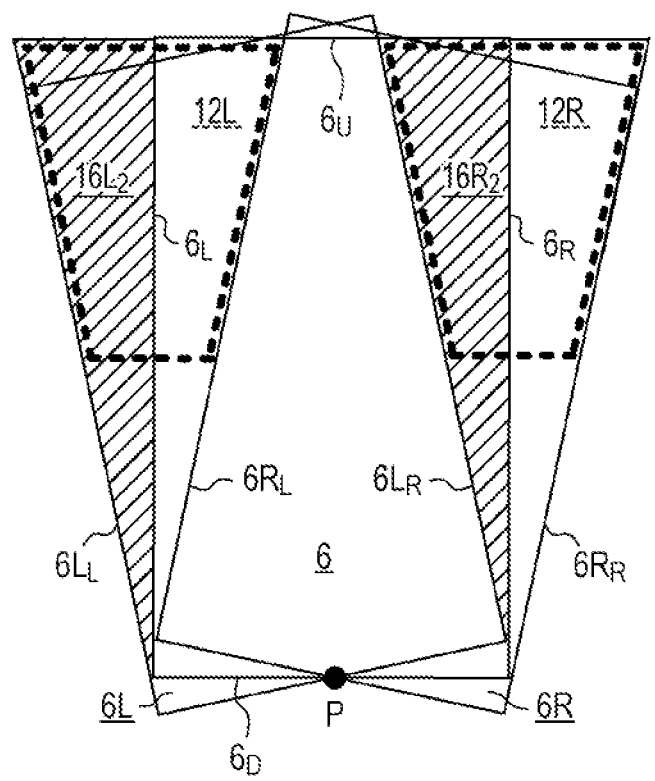
FIG. 15 is a diagram illustrating an example of a range of a second area.

FIG. 15 is a diagram illustrating an example of ranges of second areas $16R_2$ and $16L_2$. The second area $16R_2$ is a triangular area surrounded by the side $6_R$ and the side $6_U$ of the bed area 6 estimated in step S50 and the side $6L_R$ of the bed area 6L in a case where the bed area 6 is rotated in the counterclockwise direction around the point P as the center of rotation to the maximum deviation angle $\theta_{max}$.

On the other hand, the second area $16L_2$ is a triangular area surrounded by the side $6_L$ and a line obtained by extending the side $6_U$ of the bed area 6 estimated in step S50 and the side $6L_L$ of the bed area 6L in a case where the bed area 6 is rotated in the counterclockwise direction around the point P as the center of rotation to the maximum deviation angle $\theta_{max}$.

Figure 16:
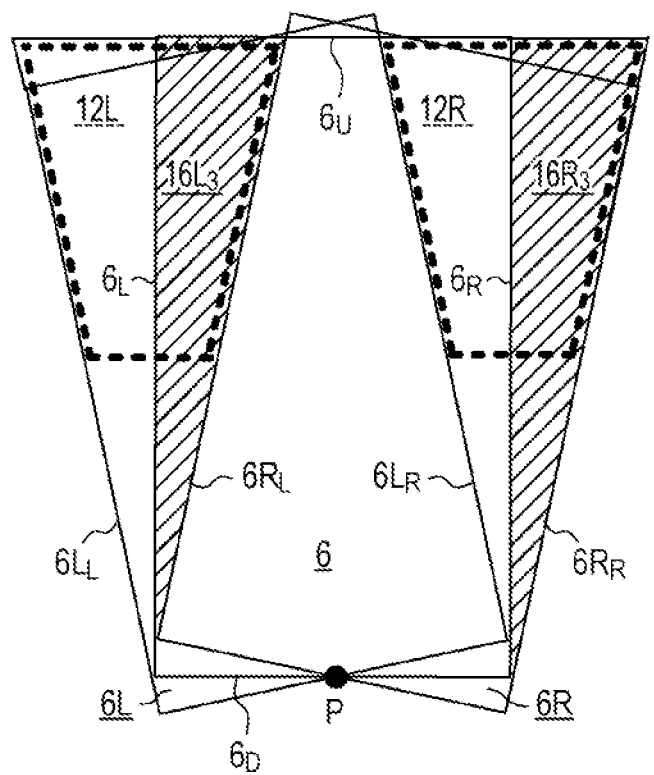
FIG. 16 is a diagram illustrating an example of a range of a third area.

In addition, FIG. 16 is a diagram illustrating an example of ranges of third areas $16R_3$ and $16L_3$. The third area $16R_3$ is a triangular area surrounded by the side $6_R$ and a line obtained by extending the side $6_U$ of the bed area 6 estimated in step S50 and the side $6R_R$ of the bed area 6R in a case where the bed area 6 is rotated in the clockwise direction around the point P as the center of rotation to the maximum deviation angle $\theta_{max}$.

On the other hand, a third area $16L_3$ is a triangular area surrounded by the side $6_L$ and the side $6_U$ of the bed area 6 estimated in step S50 and the side $6R_L$ of the bed area 6R in a case where the bed area 6 is rotated in the clockwise direction around the point P as the center of rotation to the maximum deviation angle $\theta_{max}$.

The line segment information acquisition unit 40 determines that which area includes each of the line segments 8 included in the search range 12R or 12L for each of the line segments 8 and acquires the contour candidate line segment which is considered to indicate the contours of the bed 5 among the line segments 8.

As illustrated in FIGS. 14 to 16, overlapping portions exist between the first area $16R_1$ and the second area $16R_2$ and between the first area $16R_1$ and the third area $16R_3$ that are set in the periphery of the side $6_R$ of the bed area 6. In addition, overlapping portions also exist between the first area $16L_1$ and the second area $16L_2$ and between the first area $16L_1$ and the third area $16L_3$ that are set in the periphery of the side $6_L$ of the bed area 6.

Here, a case where the line segments 8 are included in the search range 12R and an i-th area (i=1, 2, and 3) means a case where both ends of the line segments 8 are included in the search range 12R and the i-th area. Further, a case where the both ends of the line segment 8 are included in the i-th area when one end of the line segment 8 is included in the search range 12R and the other end of the line segment 8 is included in the non-search range 15R also means the case where the line segment 8 are included in the search range 12R and the i-th area.

Hereinafter, an end with a larger Y coordinate value at the both ends of the line segment 8 is referred to as "end 8A" and an end with a smaller Y coordinate value is referred to as "end 8B".

In the same manner, a case where the line segments 8 are included in the search range 12L and an i-th area (i=1, 2, and 3) means a case where both ends of the line segments 8 are included in the search range 12L and the i-th area. Further, a case where the both ends of the line segment 8 are included in the i-th area when the end 8A of the line segment 8 is included in the search range 12L and the end 8B of the line segment 8 is included in the non-search range 15L also means the case where the line segment 8 are included in the search range 12L and the i-th area.

Figure 17:
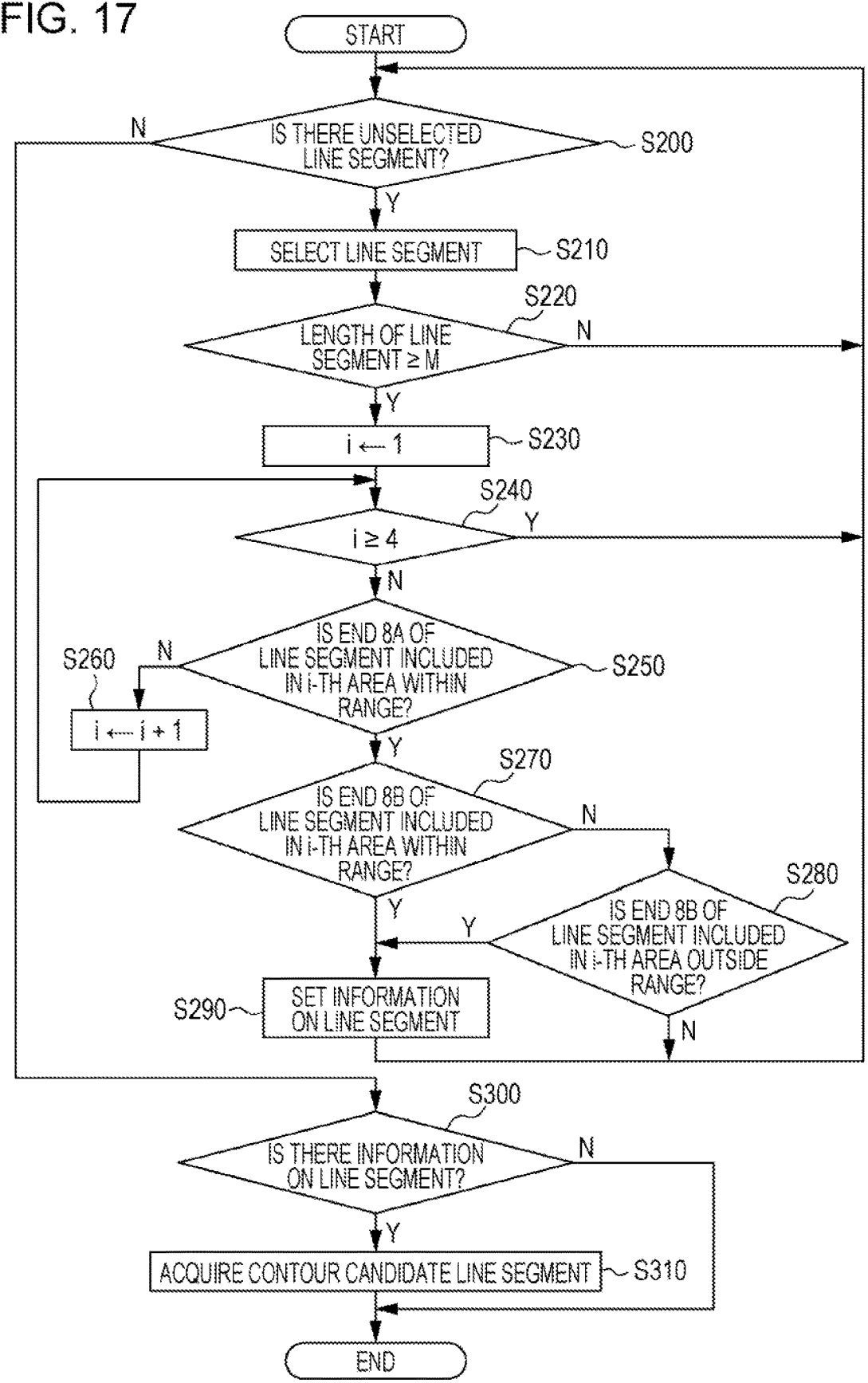
FIG. 17 is a flowchart illustrating an example of a flow of a line segment information determination process.

It is determined that which area includes the line segments 8 by executing a line segment information determination process illustrated in FIG. 17. For convenience of explanation, the line segment information determination process in one search range, specifically, the search range 12R will be described here, but the line segment information acquisition unit 40 also performs a process for the search range 12L in the same manner as the search range 12R.

First, in step S200, the line segment information acquisition unit 40 determines whether or not an unselected line segment 8 is included among the line segments 8 extracted from the bed image 7 in step S20 of FIG. 7 and the process is moved to step S210 in a case of the positive determination.

In step S210, the line segment information acquisition unit 40 selects one line segment 8 among the unselected line segments 8. Hereinafter, the line segment 8 selected in step S210 is particularly referred to as "representative line segment 8".

In step S220, the line segment information acquisition unit 40 determines whether or not a length of the representative line segment 8 is equal to or longer than a prescribed or certain length M. In a case of the negative determination, the process is returned to step S200 and the next unselected line segment 8 is selected in step S210.

The prescribed or certain length M represents, for example, a lower limit of the length of line segment 8 corresponding to the contour of the bed 5. As described above, the line segments 8 representing the contours of the bed 5 are the line segments 8 having relatively long line segments. In a case where the length of the representative line segment 8 is less than the prescribed or certain length M, it is considered that the representative line segment 8 is not the contour of the bed 5. Accordingly, in a case where a determination process of step S220 is the negative determination, the current representative line segment 8 is not included in a contour candidate line segment.

Furthermore, the prescribed or certain length M is obtained in advance by an experiment by the actual bed area extraction apparatus 1, by a computer simulation based on design specifications of the bed area extraction apparatus 1, or the like and may be stored in, for example, a predetermined area of the memory 104.

On the other hand, the process is moved to step S230 in a case where the determination process of step S220 is the positive determination.

In step S230, the line segment information acquisition unit 40 initializes a variable i to "1". In step S240, the line segment information acquisition unit 40 determines whether or not the variable i is equal to or larger than "4".

Since it is determined that which of three areas, that is, the first area $16R_1$, the second area $16R_2$, and the third area $16R_3$ includes the representative line segment 8, the line segment information acquisition unit 40 performs an area determination at most three times. The variable i is a variable indicating an area number to be determined for a determination whether or not the representative line segment 8 is included, and the variable i indicates the number of repetitions of the area determination. When the variable i is equal to or larger than "4", it means that the line segment 8 is not included in any area.

In a case where the determination process of step S240 is the positive determination, the process is returned to step S200 and the next unselected line segments 8 is selected in step S210. That is, the current representative line segment 8 is not included in a contour candidate line segment.

On the other hand, the process is moved to step S250 in a case where the determination process of step S240 is the negative determination.

In step S250, the line segment information acquisition unit 40 determines whether or not the end 8A of the representative line segment 8 is included in the search range 12R and the i-th area $16R_1$.

Here, for example, a method for determining whether or not an end of the representative line segment 8 is included in a certain area will be described.

Figure 18:
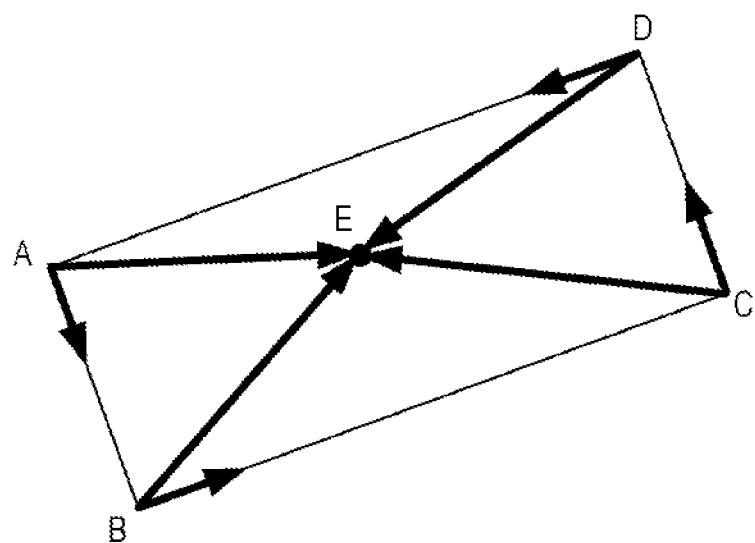
FIG. 18 is a diagram illustrating an example of a point included in a closed area.

As illustrated in FIG. 18, it is considered that, for example, a point E corresponding to the end of the representative line segment 8 is included in a closed area surrounded by a rectangle ABCD on real space coordinate system. Furthermore, values of Z coordinate of the rectangle ABCD and the point E are assumed to be the same.

First, the line segment information acquisition unit 40 sets a vector along each of sides of the rectangle ABCD in a counterclockwise direction from each of vertexes. Specifically, the line segment information acquisition unit 40 sets a vector AB from a vertex A toward a vertex B, a vector BC from the vertex B toward a vertex C, a vector CD from the vertex C toward a vertex D, and a vector DA from the vertex D toward the vertex A with respect to the rectangle ABCD.

Next, the line segment information acquisition unit 40 sets vectors from each of the vertices toward the point E. Specifically, the line segment information acquisition unit 40 sets a vector AE from the vertex A toward the point E, a vector BE from the vertex B toward the point E, a vector CE from the vertex C toward the point E, and a vector DE from the vertex D toward the point E.

Then, the line segment information acquisition unit 40 calculates based on expressions (4) to (7).

$$(B.x-A.x)*(E.y-A.y)-(B.y-A.y)*(E.x-A.x) \quad (4)$$

$$(C.x-B.x)*(E.y-B.y)-(C.y-B.y)*(E.x-B.x) \quad (5)$$

$$(D.x-C.x)*(E.y-C.y)-(D.y-C.y)*(E.x-C.x) \quad (6)$$

$$(A.x-D.x)*(E.y-D.y)-(A.y-D.y)*(E.x-D.x) \quad (7)$$

Here, the expression (4) is an arithmetic expression of a cross product of the vector AB and the vector AE, the expression (5) is an arithmetic expression of a cross product of the vector BC and the vector BE, the expression (6) is an arithmetic expression of a cross product of the vector CD and the vector CE, and the expression (7) is an arithmetic expression of a cross product of the vector DA and the vector DE. In addition, a notation of "$\lambda.x$" ($\lambda$=A, B, C, D, and E) indicates a value of an X coordinate of a point $\lambda$ and a notation "$\lambda.y$" indicates a value of a Y coordinate of the point $\lambda$.

When each of calculation results of the expressions (4) to (7) is equal to or larger than "0", the line segment information acquisition unit 40 determines that the point E is included within the closed area of the rectangle ABCD. In addition, when at least one of the calculation results of the expressions (4) to (7) is less than "0", the line segment information acquisition unit 40 determines that the point E is not included within the closed area of the rectangle ABCD. In FIG. 18, a method of determining whether or not the point E is included using the rectangle ABCD as an example is illustrated, but by applying a method to a polygon other than a rectangle, it may be determined whether or not the point is included in the polygon.

That is, the line segment information acquisition unit 40 may determine whether or not the end 8A of the representative line segment 8 is included in the search range 12R and the i-th area $16R_1$ from the calculation results of the expressions (4) to (7). Furthermore, whether or not the ends 8A and 8B of the representative line segment 8 are included in the closed area is not limited thereto, and a known determination method such as a crossing number algorithm, a winding number algorithm, or the like may be used.

In a case where the determination process of step S250 is the negative determination, the end 8A of the representative line segment 8 is not included in the i-th area $16R_4$ represented by the current variable i within the search range 12R, so that the process is moved to step S260.

In step S260, the line segment information acquisition unit 40 adds "1" to the variable i and the process is moved to step S240. Then, the line segment information acquisition unit 40 determines whether or not the end 8A of the representative line segment 8 is included in the i-th area $16R_1$ within the search range 12R different from an area determined in previous step S250.

In step S250, in a case where the end 8A of the representative line segment 8 is not included in the search range 12R, the process may be not moved to step S260 but immediately moved step S200 in order to confirm that the current representative line segment 8 is not the contour candidate line segment.

The process is moved to step S270 in a case where the determination process of step S250 is the positive determination.

In step S270, the line segment information acquisition unit 40 determines whether or not the end 8B of the representative line segment 8 is included in the search range 12R and the i-th area $16R_1$. The process is moved to step S280 in a case of the negative determination.

In step S280, the line segment information acquisition unit 40 determines whether or not the end 8B of the representative line segment 8 is included in the non-search range 15R and the i-th area 16R. In a case of the negative determination, the process is returned to step S200 and the next unselected line segments 8 is selected in step S210 in order to confirm that the current representative line segment 8 is the not contour candidate line segment.

On the other hand, in a case where the determination process of step S270 or the determination process of step S280 is the positive determination, the representative line segment 8 is included in the search range 12R and one of the first area $16R_1$, the second area $16R_2$, and the third area $16R_3$.

Then, the process is moved to step S290. In step S290, the line segment information acquisition unit 40 stores information specifying the representative line segment 8 and information indicating characteristic of the representative line segment 8, for example, in a predetermined area of the memory 104 in association with the representative line segment 8. Specifically, the line segment information acquisition unit 40 associates an ID number for specifying the representative line segment 8, coordinates values of the ends 8A and 8B of the representative line segment 8 on real space coordinate system, the length of the representative line segment 8, and the variable i indicating an area within the search range 12R in which the representative line segment 8 is included.

Then, the process is returned to step S200, and the line segment information acquisition unit 40 repeats the processes of steps S200 to S290 until all of the line segments 8 extracted in step S20 of FIG. 7 are selected.

On the other hand, in a case where all of the line segments 8 extracted in step S20 are selected, the determination process of step S200 becomes the negative determination and the process is moved to step S300.

In step S300, the line segment information acquisition unit 40 determines whether or not there is information on the line segments 8 stored in the predetermined area of the memory 104 in step S290. In a case of the negative determination, it is regarded that there is no line segment 8 that becomes the contour candidate line segment among the line segments 8 extracted in step S20 and the line segment information determination process illustrated in FIG. 17 is ended.

On the other hand, the process is moved to step S310 in a case where the determination process of step S300 is the positive determination.

In step S310, the line segment information acquisition unit 40 acquires contour candidate line segment which is considered to be most similar the contours of the bed 5 among contour candidate line segments based on the information on the line segments 8 stored in the memory 104 in step S290. Specifically, the line segment information acquisition unit 40 selects a longest line segment 8 among the line segments 8 stored in the memory 104 in step S290 and stores the longest line segment 8 as the final contour candidate line segment in the search range 12R to the memory 104. Hereinafter, "contour candidate line segment" indicates the final contour candidate line segment selected in step S310.

A reason why the longest line segment 8 is the contour candidate line segment is that, as described above, the line segments 8 representing the contours of the bed 5 are extracted as the relatively long line segment 8 in many cases.

In addition, as illustrated in FIG. 17, the line segment information acquisition unit 40 determines an area in which the line segments 8 is included in this order of the first area 16R₁, the second area 16R₂, and the third area 16R₃. In a case where the line segment 8 are included in an overlap area between the first area 16R₁ and the second area 16R₂ or an overlap area between the first area 16R₁ and the third area 16R₃, the line segment information acquisition unit 40 determines that the line segment 8 is included in the first area 16R₁.

Thus, the line segment information determination process illustrated in FIG. 17 is ended.

Next, in step S80 of FIG. 7, the correction determination unit 50 determines whether or not each of the contour candidate line segments of the search ranges 12R and 12L acquired in step S70 is the line segments 8 corresponding to the contours of the bed 5. The correction determination unit 50 determines whether or not to correct the bed area 6 estimated in step S50 based on the determination result.

Figure 19:
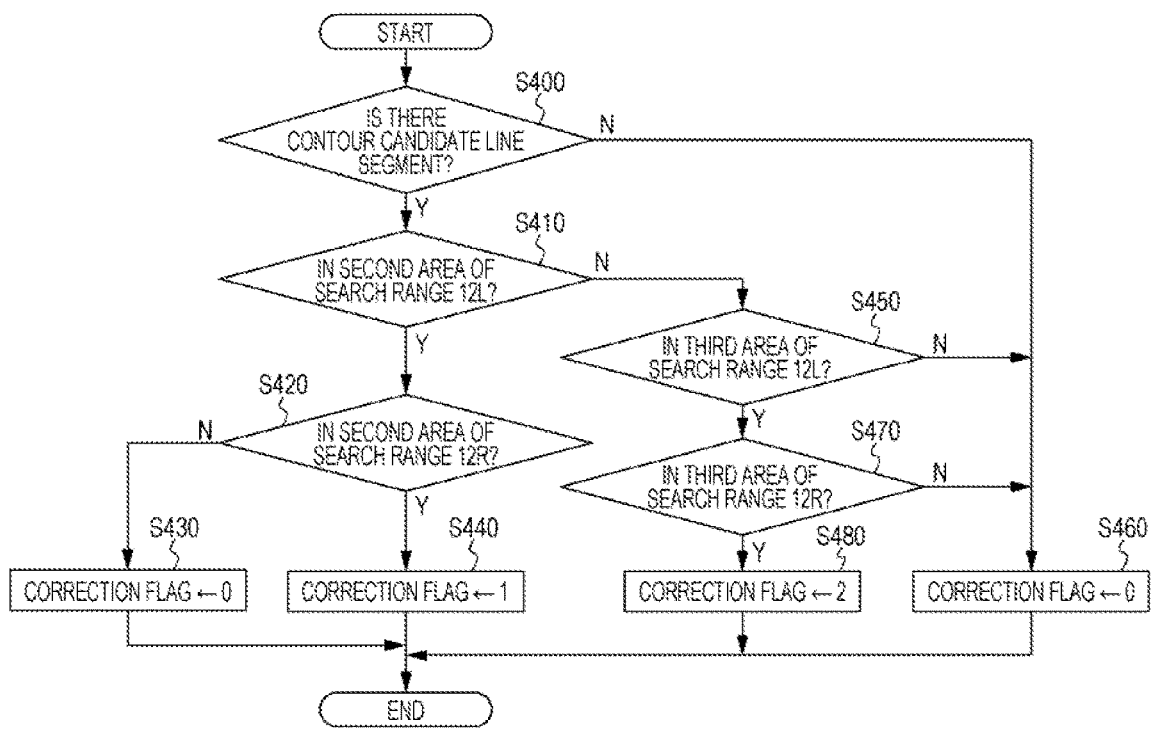
FIG. 19 is a flowchart illustrating an example of a flow of a correction determination process.

FIG. 19 is a flowchart illustrating an example of a correction determination process executed by the correction determination unit 50 in step S80.

First, in step S400, the correction determination unit 50 determines whether or not the contour candidate line segments respectively exist in the search ranges 12R and 12L.

In a case where the deviation between the position of the bed 5 and the estimated bed area 6 occurs, the contour candidate line segments corresponding to the contours in the longitudinal direction of the bed 5 exist in each of the search ranges 12R and 12L. In a case where the contour candidate line segment does not exist in the search ranges 12R and 12L and the contour candidate line segment exists in the search range of only one of the search ranges 12R and 12L, it is considered that the contour candidate line segment is not the line segments 8 corresponding to the contour of the bed 5. In a case where the determination process of step S400 is the negative determination, it is regarded that there is no deviation between the position of the bed 5 and the bed area 6 estimated in step S50, and the process is moved to step S460.

In step S460, the correction determination unit 50 sets, for example, a correction flag stored in a predetermined area of the memory 104 to "0". A value of the correction flag indicates the presence or absence of correction. For example, "0" indicates that no correction is desirable.

On the other hand, the process is moved to step S410 in a case where the determination process of step S400 is the positive determination.

In step S410, the correction determination unit 50 determines whether or not the contour candidate line segment of the search range 12L acquired in step S70 of FIG. 7 is included in the second area 16L₂. Which area includes the contour candidate line segment may be determined by referring to the variable i associated with the contour candidate line segment in step S290 of FIG. 17. The process is moved to step S420 in a case where the determination process of step S410 is the positive determination.

In step S420, the correction determination unit 50 determines whether or not the contour candidate line segment of the search range 12R acquired in step S70 is included in the second area 16R₂. In a case of the negative determination, the process is moved to step S430. In step S430, the correction determination unit 50 sets the correction flag to "0". On the other hand, in a case of the positive determination, the process is moved to step S440. In step S440, the correction determination unit 50 sets the correction flag to "1".

In a case where the contour candidate line segment is included in the second area 16L₂ of the search range 12L, when the contour candidate line segment is the line segments 8 representing the contour of the bed 5, a contour candidate line segment opposing the contour candidate line segment is likely to be included in the second area 16R₂ of the search range 12R. Since a shape of the bed 5 is rectangular, when the contour candidate line segment corresponding to the contour of a left side surface of the bed 5 is deviated to the left side with respect to the bed area 6, the contour candidate line segment corresponding to the contour of a right side surface of the bed 5 is also deviated to the left side with respect to the bed area 6.

In a case where the contour candidate line segments are respectively included in the second areas 16R₂ and 16L₂, the correction determination unit 50 notifies that correction is desired to deviate the bed area 6 estimated in step S50 to the left side by setting the correction flag to "1" in step S440.

On the other hand, although the contour candidate line segment is included in the second area 16L₂ of the search range 12L, in a case where the contour candidate line segment is not included in the second area 16R₂ of the search range 12R, the contour candidate line segment included in the second area 16L₂ of the search range 12L is considered to be line segment 8 representing a part other than the contours of the bed 5. In step S430, the correction determination unit 50 notifies that correction of the bed area 6 estimated in step S50 is not desired by setting the correction flag to "0".

In addition, the process is moved to step S450 in a case where the determination process of step S410 is the negative determination.

In step S450, the correction determination unit 50 determines whether or not the contour candidate line segment of the search range 12L acquired in step S70 of FIG. 7 is included in the third area $16L_3$. In a case of the negative determination, since the contour candidate line segment corresponding to the contours of the bed 5 may not be found in the search range 12L, it is considered that the bed area 6 estimated in step S50 represents the actual position of the bed 5. The process is moved to step S460, and as described above, it is notified that correction of the bed area 6 estimated in step S50 is not desired by setting the correction flag to "0".

On the other hand, the process is moved to step S470 in a case where the determination process of step S450 is the positive determination.

In step S470, the correction determination unit 50 determines whether or not the contour candidate line segment of the search range 12R acquired in step S70 is included in the third area $16R_3$. In a case of the negative determination, since it is considered that contour candidate line segment included in the third area $16L_3$ of the search range 12L is the line segment 8 representing other than the contours of the bed 5 by the reason described above, the process is moved to step S460 and the correction flag is set to "0".

On the other hand, in a case where the determination process of step S470 is the positive determination, each of the contour candidate line segments is included in the third area $16R_3$ of the search range 12R and the third area $16L_3$ of the search range 12L. The process is moved to step S480. Then, in step S480, the correction determination unit 50 notifies that correction to deviate the bed area 6 estimated in step S50 to a right side is desired by setting the correction flag to "2".

Thus, the correction determination process is ended.

Although the vicinity of side $6_R$ and side $6_L$ of the bed area 6 and the first areas $16R_1$ and $16L_1$ illustrate the same area, as described above, the line segments 8 included in the vicinity of side $6_R$ or side $6_L$ of the bed area 6 tends to be contours of the accessories or the like near the bed 5. That is, the contour candidate line segment included in the first area $16R_1$ or $16L_1$ may be regarded as not being the line segments 8 corresponding to the contour of the bed 5.

In a case where the contour candidate line segment is included in at least one of the first area $16R_1$ and $16L_1$ in the correction determination process, the correction determination unit 50 sets the correction flag to "0" and determines that correction of the bed area 6 is not desired.

Next, in step S90 of FIG. 7, the correction determination unit 50 determines whether or not correction of the bed area 6 is executed by referring the value of the correction flag set in step S80. In a case of the negative determination, that is, in a case where the correction flag is "0", the correction determination unit 50 does not execute correction of the bed area 6 and determines that the bed 5 exists in the bed area 6 estimated in step S50. On the other hand, in a case of the positive determination, that is, in a case where the correction flag is "1" or "2", the process is moved to step S100 for performing correction of the bed area 6.

Figure 20:
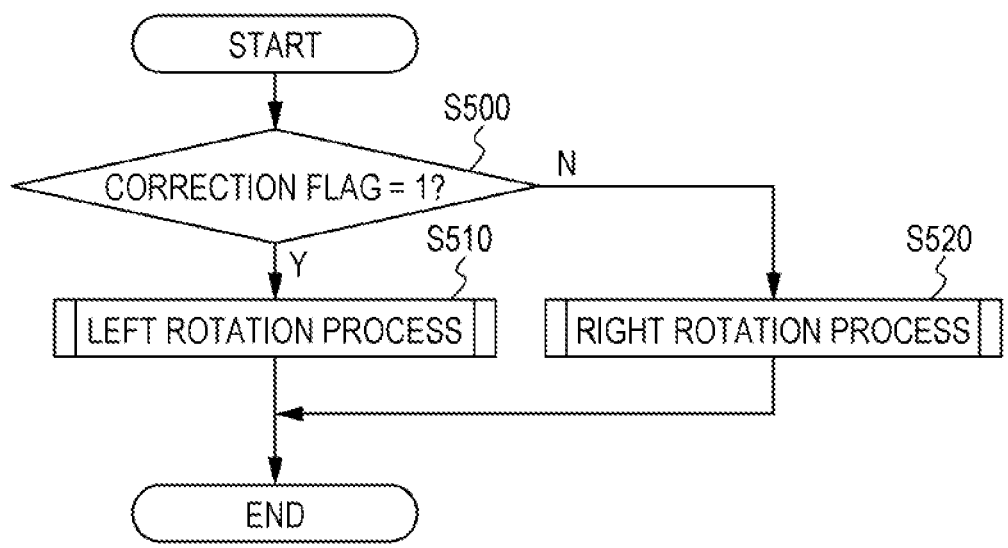
FIG. 20 is a flowchart illustrating an example of a flow of a correction process.

In step S100, the correction unit 60 executes a correction process illustrated in FIG. 20.

First, in step S500, the correction unit 60 determines whether or not the value of the correction flag set in step S80 of FIG. 7 is "1". In a case of the positive determination, that is, in a case where the contour candidate line segment is respectively included in the second area $16R_2$ within the search range 12R and the second area $16L_2$ of the search range 12L, it may be determined that the actual position of the bed 5 is inclined to the left direction with respect to the bed area 6. The process is moved to step S510 and a left rotation process is executed with respect to the bed area 6 so that the side $6_R$ and the side $6_L$ of the bed area 6 are along a direction of the contour candidate line segment included in the second area $16R_2$ within the search range 12R and the second area $16L_2$ within the search range 12L.

On the other hand, in a case of the negative determination, that is, in a case where the contour candidate line segment is respectively included in the third area $16R_3$ within the search range 12R and the third area $16L_3$ of the search range 12L, it may be determined that the actual position of the bed 5 is inclined to the right direction with respect to the bed area 6. The process is moved to step S520 and a right rotation process is executed with respect to the bed area 6 so that the side $6_R$ and the side $6_L$ of the bed area 6 are along a direction of the contour candidate line segment included in the third area $16R_3$ within the search range 12R and the third area $16L_3$ within the search range 12L.

Since the same rotation process is performed except that the direction of rotation of the bed area 6 is different in steps S510 and S520, the rotation process of the bed area 6 will be described as an example of the left rotation process or the counterclockwise direction process of step S510 with reference to FIGS. 21 to 25.

Figure 21:
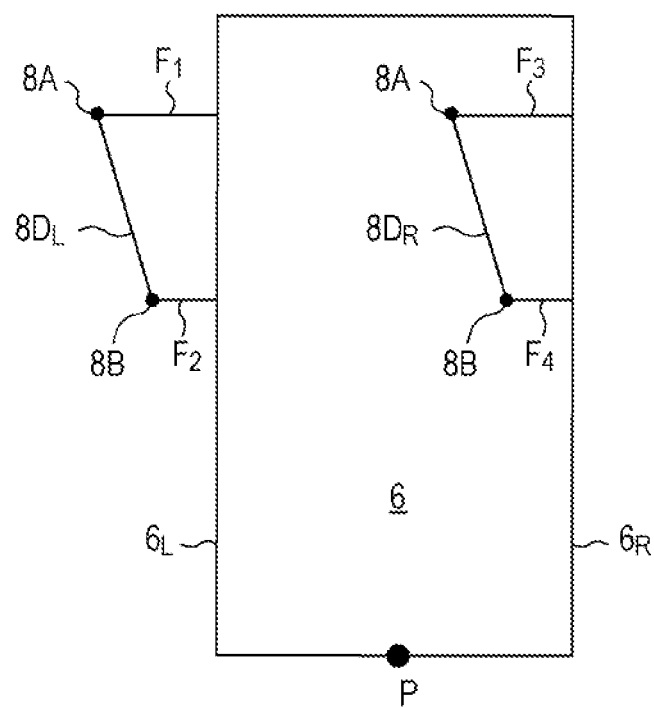
FIG. 21 is a diagram illustrating an example of a positional relationship between the bed area and contour candidate line segments before rotation.

As illustrated in FIG. 21, it is assumed that a contour candidate line segment $8D_R$ and a contour candidate line segment $8D_L$ exist in the bed area 6 estimated in step S50, where the contour candidate line segment $8D_R$ is included in the second area $16R_2$ within the search range 12R and the contour candidate line segment $8D_L$ is included in the second area $16L_2$ within the search range 12L.

The correction unit 60 rotates the bed area 6 in the counterclockwise direction around the point P as much as possible so that directions of the side $6_R$ and the side $6_L$ of the bed area 6 are respectively coincided with directions of the contour candidate line segment $8D_R$ and the contour candidate line segment $8D_L$.

At this time, the correction unit 60 evaluates a degree of a coincidence between the directions of the side $6_R$ and the contour candidate line segment $8D_R$ and a degree of a coincidence between the directions of the side $6_L$ and the contour candidate line segment $8D_L$ based on a distance between the side $6_R$ and the contour candidate line segment $8D_R$ and a distance between the side $6_L$ and the contour candidate line segment $8D_L$. Specifically, the degree of a coincidence between the directions of the side $6_R$ and the contour candidate line segment $8D_R$ and the degree of a coincidence between the directions of the side $6_L$ and the contour candidate line segment $8D_L$ are evaluated by a total value of lengths of lines which are respectively perpendicular to the side $6_R$ and $6_L$ and extend respectively from both of the ends 8A and 8B of the contour candidate line segments $8D_R$ and $8D_L$ to the side $6_R$ and the side $6_L$.

A coordinate of the end 8A of the contour candidate line segment $8D_L$ is $(x_1, y_1)$ in real space coordinate system and a coordinate of the end 8B of the contour candidate line segment $8D_L$ is $(x_2, y_2)$ in the real space coordinate system. In addition, a coordinate of the end 8A of the contour candidate line segment $8D_R$ is $(x_3, y_3)$ in real space coordinate system and a coordinate of the end 8B of the contour candidate line segment $8D_R$ is $(x_4, y_4)$ in the real space coordinate system.

In addition, a length of the line from the end 8A of the contour candidate line segment $8D_L$ to the side $6_L$ is $F_1$ and a length of the line from the end 8B of the contour candidate line segment $8D_L$ to the side $6_L$ is $F_2$. In addition, a length of the line from the end 8A of the contour candidate line segment $8D_R$ to the side $6_R$ is $F_3$ and a length of the line from the end 8B of the contour candidate line segment $8D_R$ to the side $6_R$ is $F_4$.

In the real space coordinate system, it is assumed that the side $6_L$ and the side $6_R$ of the bed area 6 are represented by a straight line of an expression (8) including a and b as coefficients and c as a constant.

$$ax+by+c=0 \quad (8)$$

In this case, since the length $F_n$ (n=1, 2, 3, and 4) is represented an expression (9), a score $S_c$ indicating the degree of the coincidence between the directions of the side $6_R$ and the contour candidate line segment $8D_R$ and the degree of the coincidence between the directions of the side $6_L$ and the contour candidate line segment $8D_L$ may be calculated by an expression (10).

$$F_n=(ax_n+by_n+c)/(a^2+b^2)^{1/2} \quad (9)$$

$$S_c=\Sigma_n F_n \quad (10)$$

Next, a relationship between a degree of a coincidence of the direction of the line segments 8 and the score $S_c$ will be described.

Figure 22:
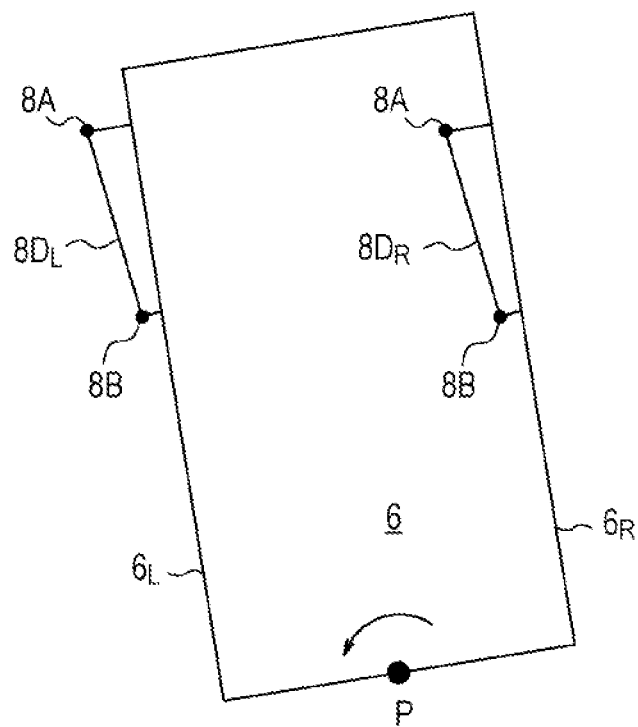
FIG. 22 is a diagram illustrating an example of a positional relationship between the bed area and the contour candidate line segments during rotation.

Since the contour candidate line segment $8D_R$ and the contour candidate line segment $8D_L$ are on left sides of the side $6_R$ and the side $6_L$ of the bed area 6, when the bed area 6 illustrated in FIG. 21 is rotated in the counterclockwise direction around the point P, the length $F_n$ is changed to be short as illustrated in FIG. 22. Therefore, the score $S_c$ decreases.

Figure 23:
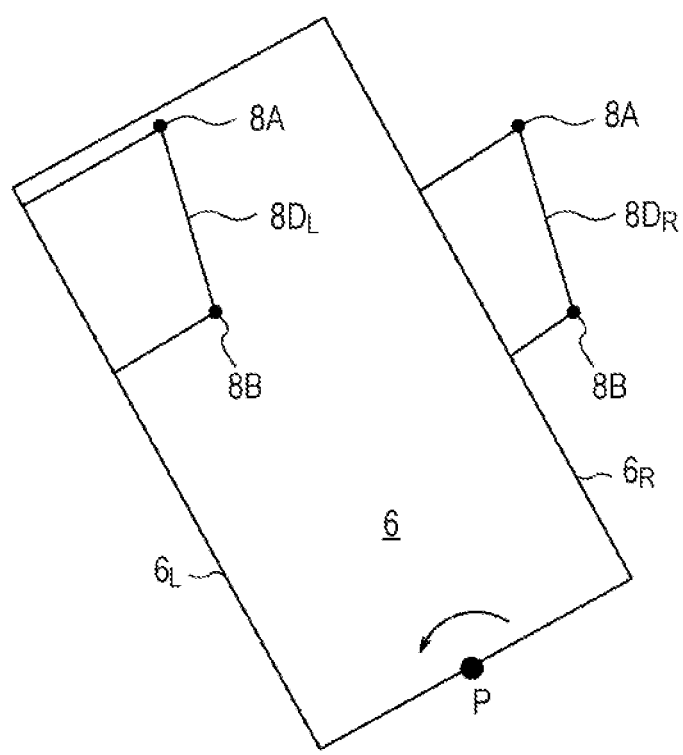
FIG. 23 is a diagram illustrating an example of a positional relationship between the bed area and the contour candidate line segments during rotation.

When the bed area 6 is further rotated in the counterclockwise direction, the side $6_R$ and the side $6_L$ of the bed area 6 passes through the contour candidate line segment $8D_R$ and the contour candidate line segment $8D_L$ and the contour candidate line segment $8D_R$ and the contour candidate line segment $8D_L$ are respectively located on the right side of the side $6_R$ and the side $6_L$ of the bed area 6 as illustrated in FIG. 23. That is, since the length $F_n$ changes to be long, the score $S_c$ increases at this time.

Figure 24:
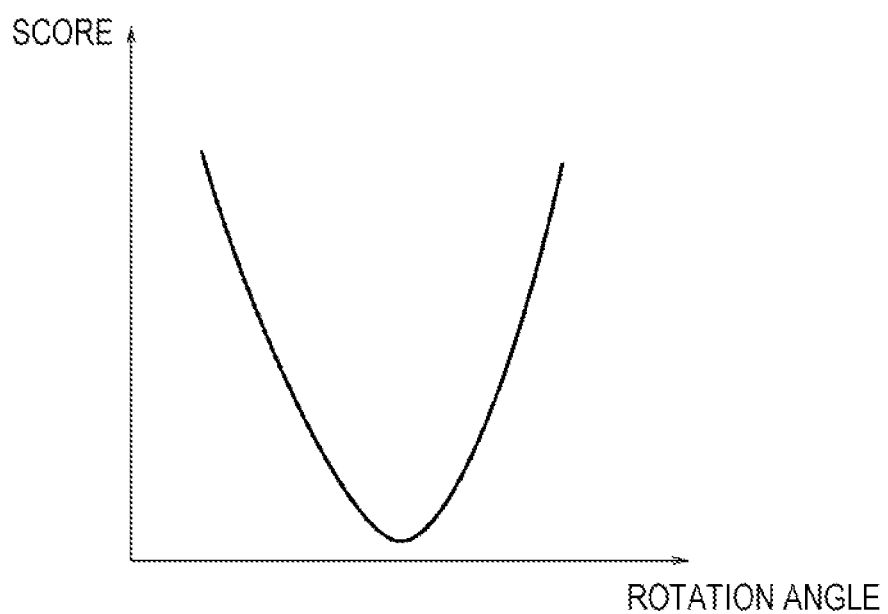
FIG. 24 is a graph illustrating an example of a change in scores with respect to a rotation angle.

As illustrated in FIG. 24, the score $S_c$ temporarily decreases as a rotation angle of the bed area 6 increases, but then increases and changes so as to draw a downward convex parabola.

Since a rotation angle in a case where the score $S_c$ is the smallest is a rotation angle when the directions of the side $6_R$ and the contour candidate line segment $8D_R$ mostly coincide with each other and the directions of the side $6_L$ and the contour candidate line segment $8D_L$ mostly coincide with each other, the correction unit 60 corrects the bed area 6 by focusing on such a change in the score $S_c$.

Figure 25:
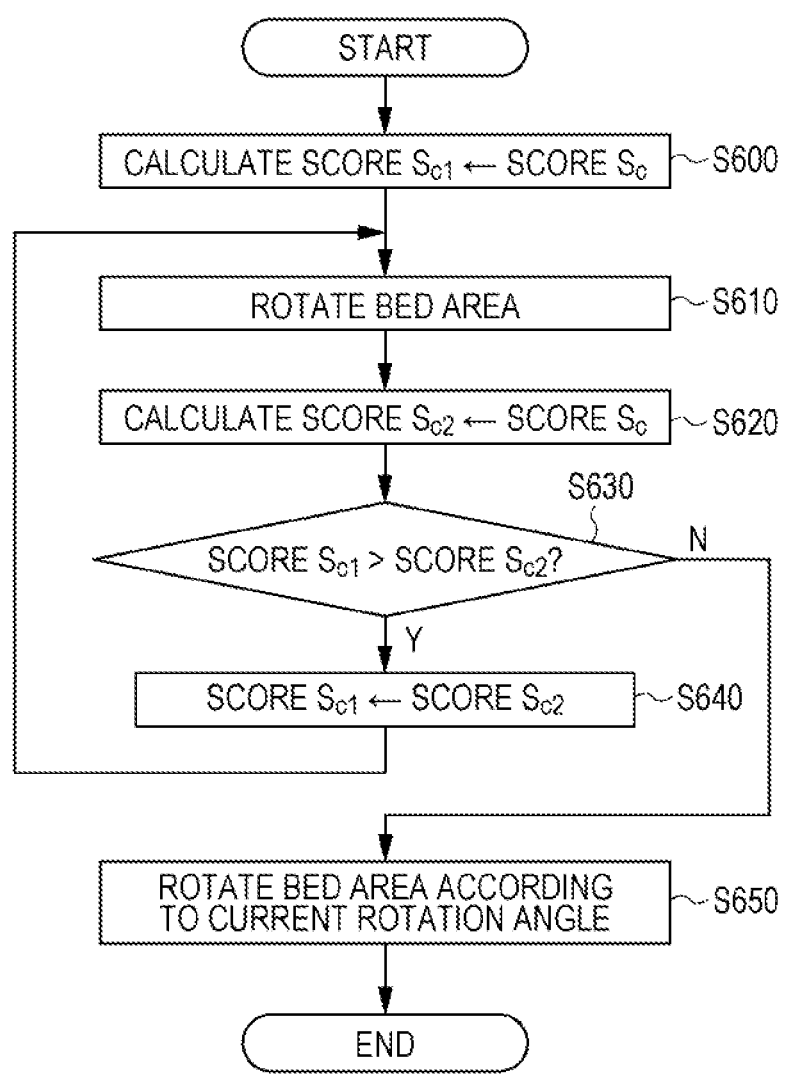
FIG. 25 is a flowchart illustrating an example of a flow of a rotation process.

FIG. 25 illustrates the specific rotation process of the bed area 6 performed in the left rotation process of step S510 of FIG. 20.

First, in step S600, the correction unit 60 calculates the length $F_n$ (n=1 to 4) of the perpendicular lines respectively hanging from both of the ends 8A and 8B of the contour candidate line segments $8D_R$ and $8D_L$ to the side $6_R$ and the side $6_L$ based on the expression (9). The correction unit 60 calculates the score $S_c$ corresponding to the bed area 6 estimated in step S50 of FIG. 7 and stores the calculated score $S_c$ to, for example, a predetermined area of the memory 104 as a score $S_{c1}$ based on the expression (10).

In step S610, the correction unit 60 rotates the current bed area 6 in the counterclockwise direction by a predetermined or certain rotation angle δ.

In step S620, the correction unit 60 calculates the score $S_c$ corresponding to the bed area 6 rotated in the counterclockwise direction in step S610 and stores the calculated score $S_c$ to, for example, the predetermined area of the memory 104 as a score $S_{c2}$ in the same method as step S600.

In step S630, the correction unit 60 compares the score $S_{c1}$ stored in step S600 with the score $S_{c2}$ stored in step S620 and determines whether the score $S_{c1}$ is larger than the score S2. In a case of the positive determination, since the score $S_c$ of the bed area 6 after rotating may be smaller than the score $S_c$ of the bed area 6 before rotating by further rotating the bed area 6 in the counterclockwise direction, the process is moved to step S640.

In step S640, the correction unit 60 updates the score $S_{c1}$ to the score $S_{c2}$ corresponding to the bed area 6 after being rotated to the left direction by the rotation angle α in step S610. The process is moved to step S610. Then, the correction unit 60 rotates the bed area 6 in the counterclockwise direction by the rotation angle δ in increments until the score $S_{c2}$ is equal to or larger than the score $S_{c1}$ by repeating steps S610 to S640.

In a case where the score $S_{c2}$ becomes equal to or larger than the score $S_{c1}$, the determination process of step S630 becomes the negative determination and the process is moved to step S650.

Since a rotation angle in a case where the determination process of step S630 is the negative determination may be considered to be a rotation angle corresponding to a minimum point of a graph illustrated in FIG. 24, an angle when the directions of the sides $6_R$ and $6_L$ of the bed area 6 are respectively most equal to the directions of the contour candidate line segment $8D_R$ and the contour candidate line segment $8D_L$ is illustrated.

In step S650, the correction unit 60 corrects the bed area 6 estimated in step S50 of FIG. 7 to a position of the bed area 6 represented by the current rotation angle.

As described above, the rotation process illustrated in FIG. 25 ends, the correction process of step S100 of FIG. 7 ends, and the bed area extraction process illustrated in FIG. 7 ends.

In order to evaluate the score $S_c$ corresponding to the bed area 6 by the rotation angle δ step, accuracy of the degree of a coincidence between the directions of the side $6_R$ and the side $6_L$ of the bed area 6 and the degree of a coincidence between the directions of the contour candidate line segment $8D_R$ and the contour candidate line segment $8D_L$ improves as the rotation angle δ decreases in step S610.

The bed area 6 extracted by the bed area extraction process described above is used to an abnormality detection process of a patient or a care receiver using the bed 5. By executing the bed area extraction process described above at predetermined or certain time intervals, a complicated calibration operation may not have to be performed at the time of installing the bed area extraction apparatus 1, and the abnormality detection process with high-precision may be maintained even when a height of a floor of the bed 5 and a reclining angle are changed.

According to the present embodiment, the bed area extraction apparatus 1 extracts the U-shaped portion 11 including the line segments 8 corresponding to the head board 3 from the bed image 7 and estimates the bed area 6 according to the U-shaped portion 11. The bed area extraction apparatus 1 sets the search ranges 12R and 12L in the periphery of the estimated bed area 6 and selects the contour candidate line segment corresponding to the contours of the bed 5 based on the length and the direction of the line segments 8 within the search ranges 12R and 12L. Then, the bed area extraction apparatus 1 corrects the estimated bed area 6 by rotating the bed area 6 so that the direction of the long side of the bed area 6 is equal to the direction of the selected contour candidate line segment.

Even when the head board 3 is mounted on the bed 5 and the line segments 8 corresponding to the contour of the bed 5 are distorted, the bed area 6 may be accurately estimated from the bed image 7.

In addition, since the bed area extraction apparatus 1 corrects the bed area 6 based on the contour candidate line segment corresponding to each of the long sides of the bed 5, the bed area 6 may be corrected even when the contour candidate line segments corresponding to all of the contour of the bed 5 are not obtained.

In addition, when selecting the contour candidate line segment from among the line segments 8 included in the search ranges 12R and 12L, the bed area extraction apparatus 1 determines whether or not the line segment 8 is a contour candidate line segment based on an area including the line segments 8. Since the calculation amount is smaller than in a case where the angle formed by the line segment 8 and the long sides of the bed area 6 is calculated and whether or not the line segment 8 is the contour candidate line segment is determined, the bed area extraction apparatus 1 may shorten time spent on correction of the bed area 6.

In addition, the bed area extraction apparatus 1 sets the range in which the contour candidate line segment is included as the search ranges 12R and 12L and determines whether or not the line segments 8 within the search ranges 12R and 12L is the contour candidate line segment. The bed area extraction apparatus 1 may efficiently search the contour candidate line segment as compared with a case of determining whether or not each of all of the line segments 8 is the contour candidate line segment for all of the line segments 8 extracted from the bed image 7.

In addition, in the present embodiment, an aspect in which the bed area extraction program 120 is stored (installed) in advance in the storage unit 106 has been described, but the present disclosure is not limited thereto. The bed area extraction program according to the embodiment may also be provided in a form recorded in the computer readable recording medium 116. For example, the bed area extraction program according to the disclosed technique may be provided in a form recorded on a portable recording medium such as a CD-ROM, a DVD-ROM, a Universal Serial Bus (USB) memory, or the like. In addition, the bed area extraction program according to the embodiment may be provided in a form recorded in a semiconductor memory such as a flash memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    specifying a first part of a bed candidate area in an image based on first line segments which are extracted from the image;
    setting a search range for searching a second line segment with reference to the bed candidate area which is determined based on the specified first part of the bed candidate area;
    selecting the second line segment from among one or more first line segments, which are included in the first line segments and the search range, based on a disposition of the one or more first line segments; and
    correcting the bed candidate area based on a disposition of the second line,
    wherein the specifying includes specifying, as a part of the bed candidate area, a second part including one of short sides of the bed candidate area, the one of short sides corresponding to a head board attached to one end of a bed,
    wherein the head board has a certain thickness in a longitudinal direction of the bed candidate area, and wherein the setting includes setting, to the search range, an area surrounded by lines, the lines including a long side of the bed candidate area after rotation in which the bed candidate area is rotated by an angle depending on the thickness of the head board around a point corresponding to a midpoint of the one of short sides corresponding to a short side of the bed to which the head board is attached.

2. The non-transitory computer-readable recording medium according to claim 1, wherein the second part corresponding to the head board is a U-shaped portion.

3. The non-transitory computer-readable recording medium according to claim 1, further comprising acquiring a contour segment in the search range, the contour segment being determined to be a part of a contour of the bed in a case where an inclination of the contour segment with respect to a long side of the bed candidate area is equal to or larger than a predetermined angle, wherein the correcting includes correcting the bed candidate area in a case where the contour segment is acquired.

4. The non-transitory computer-readable recording medium according to claim 3, wherein the setting includes setting a search range for each of the long sides of the bed candidate area, and wherein the correcting includes correcting the bed candidate area in a case where the contour segment is acquired from each of the set search ranges when an angular difference between the inclination of the contour segment and a rotation angle of the bed candidate area is less than a predetermined value.

5. The non-transitory computer-readable recording medium according to claim 3, wherein the contour segment includes a line segment having a length equal to or longer than a predetermined length and being the longest line segment in the search range.

6. The non-transitory computer-readable recording medium according to claim 3, wherein the correcting includes correcting the bed candidate area by rotating the bed candidate area so that the long side is parallel to a direction of the contour segment.

7. The non-transitory computer-readable recording medium according to claim 1, wherein the angle depending on the thickness of the head board is an angle formed by a side, of the head board, corresponding to the one of short sides of the bed candidate area and a diagonal line in a cross section of the head board.

8. The non-transitory computer-readable recording medium according to claim 1, wherein a misalignment between a position, in the image, corresponding to the bed and the bed candidate area is represented by an angle of a difference between a direction of the head board and a direction of a line obtained by connecting two line segments which corresponds respectively to parts of two long sides of the head board, the two long sides being parallel to each other.

9. A bed area extraction method, comprising:
specifying, by a computer, a first part of a bed candidate area in an image based on first line segments which are extracted from the image;
setting a search range for searching a second line segment with reference to the bed candidate area which is determined based on the specified first part of the bed candidate area;
selecting the second line segment from among one or more first line segments, which are included in the first line segments and the search range, based on a disposition of the one or more first line segments; and
correcting the bed candidate area based on a disposition of the second line segment,
wherein the specifying includes specifying, as a part of the bed candidate area, a second part including one of short sides of the bed candidate area, the one of short sides corresponding to a head board attached to one end of a bed,
wherein the head board has a certain thickness in a longitudinal direction of the bed candidate area, and
wherein the setting includes setting, to the search range, an area surrounded by lines, the lines including a long side of the bed candidate area after rotation in which the bed candidate area is rotated by an angle depending on the thickness of the head board around a point corresponding to a midpoint of the one of short sides corresponding to a short side of the bed to which the head board is attached.

10. The bed area extraction method according to claim 9, wherein the second part corresponding to the head board is a U-shaped portion.

11. The bed area extraction method according to claim 9, further comprising: acquiring a contour segment in the search range, the contour segment being determined to be a part of a contour of the bed in a case where an inclination of the contour segment with respect to a long side of the bed candidate area is equal to or larger than a predetermined angle, wherein the correcting includes correcting the bed candidate area in a case where the contour segment is acquired.

12. The bed area extraction method according to claim 9, further comprising: wherein the setting includes setting a search range for each of the long sides of the bed candidate area, and wherein the correcting includes correcting the bed candidate area in a case where the contour segment is acquired from each of the set search ranges when an angular difference between the inclination of the contour segment and a rotation angle of the bed candidate area is less than a predetermined value.

13. A bed area extraction apparatus, comprising:
a processor configured to:
specify a first part of a bed candidate area in an image based on first line segments which are extracted from the image;
set a search range for searching a second line segment with reference to the bed candidate area which is determined based on the specified first part of the bed candidate area;
select the second line segment from among one or more first line segments, which are included in the first line segments and the search range, based on a disposition of the one or more first line segments; and
correct the bed candidate area based on a disposition of the second line segment,
wherein the processor is configured to specify, as a part of the bed candidate area, a second part including one of short sides of the bed candidate area, the one of short sides corresponding to a head board attached to one end of a bed,
wherein the head board has a certain thickness in a longitudinal direction of the bed candidate area, and
wherein the computer configured to set, to the search range, an area surrounded by lines, the lines including a long side of the bed candidate area after rotation in which the bed candidate area is rotated by an angle depending on the thickness of the head board around a point corresponding to a midpoint of the one of short sides corresponding to a short side of the bed to which the head board is attached.

14. The bed area extraction apparatus according to claim 13, wherein the part including one of the short sides of the bed candidate area corresponding to the head board is a U-shaped portion.

* * * * *